(12) United States Patent
Sadek et al.

(10) Patent No.: US 10,397,793 B2
(45) Date of Patent: Aug. 27, 2019

(54) RADAR DETECTION IN WIRELESS NETWORK THAT USES FREQUENCY-DIVISION DUPLEXING

(71) Applicant: QUALCOMM Incorporated, San Diego, CA (US)

(72) Inventors: Ahmed Kamel Sadek, San Diego, CA (US); Mehmet Yavuz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 86 days.

(21) Appl. No.: 14/473,122

(22) Filed: Aug. 29, 2014

(65) Prior Publication Data
US 2015/0063146 A1 Mar. 5, 2015

Related U.S. Application Data

(60) Provisional application No. 61/873,636, filed on Sep. 4, 2013, provisional application No. 61/880,148, filed on Sep. 19, 2013.

(51) Int. Cl.
| | |
|---|---|
| *H04W 16/14* | (2009.01) |
| *H04L 5/14* | (2006.01) |
| *H04B 1/50* | (2006.01) |
| *H04J 1/16* | (2006.01) |

(Continued)

(52) U.S. Cl.
CPC ............ *H04W 16/14* (2013.01); *G01S 7/021* (2013.01); *H04B 1/50* (2013.01); *H04J 1/16* (2013.01);
(Continued)

(58) Field of Classification Search
CPC ......... H04J 1/16; H04K 3/224; H04L 1/0007; H04L 5/1469; H04W 24/08; H04W 52/244
(Continued)

(56) References Cited

U.S. PATENT DOCUMENTS

| | | |
|---|---|---|
| 7,024,188 B2 | 4/2006 | Khun-Jush et al. |
| 7,236,790 B2 | 6/2007 | Tsien et al. |

(Continued)

FOREIGN PATENT DOCUMENTS

| | | |
|---|---|---|
| JP | 2005223865 A | 8/2005 |
| JP | 2012142718 | 7/2012 |

(Continued)

OTHER PUBLICATIONS

International Search Report and Written Opinion—PCT/US2014/053913—ISA/EPO—dated Mar. 3, 2015.

*Primary Examiner* — Mark H Rinehart
*Assistant Examiner* — Kokou R Detse
(74) *Attorney, Agent, or Firm* — Muncy, Geissler, Olds & Lowe, P.C.

(57) ABSTRACT

An apparatus, configured to communicate with an access terminal in a wireless network and operating in a frequency-division duplexing mode, can be caused to refrain from transmitting during at least one subframe of a frame of a downlink frequency band, and can be caused to monitor for the radar transmission during the at least one subframe of the frame of the downlink frequency band. Optionally, a placement of the at least one subframe within the frame of the downlink frequency band can correspond to a placement of at least one subframe that is designated for an uplink communication within a frame of a wireless network that is operating in accordance with the Long-Term Evolution Time-Division Duplex standard, or can correspond to a placement of at least one subframe that is designated for a transmission in accordance with the Multimedia Broadcast Multicast Service specification.

30 Claims, 16 Drawing Sheets

(51) Int. Cl.
*H04L 1/00* (2006.01)
*H04W 24/08* (2009.01)
*G01S 7/02* (2006.01)
*H04K 3/00* (2006.01)
*H04W 72/12* (2009.01)
*H04W 52/24* (2009.01)
*H04W 74/00* (2009.01)
*H04W 48/02* (2009.01)
*H04W 84/04* (2009.01)

(52) U.S. Cl.
CPC .............. *H04K 3/224* (2013.01); *H04K 3/28* (2013.01); *H04K 3/822* (2013.01); *H04L 1/0007* (2013.01); *H04L 5/1469* (2013.01); *H04W 24/08* (2013.01); *H04W 72/1215* (2013.01); *H04K 2203/16* (2013.01); *H04K 2203/18* (2013.01); *H04K 2203/36* (2013.01); *H04W 48/02* (2013.01); *H04W 52/244* (2013.01); *H04W 74/00* (2013.01); *H04W 84/045* (2013.01)

(58) Field of Classification Search
USPC ........................................................ 370/252
See application file for complete search history.

(56) References Cited

U.S. PATENT DOCUMENTS

| | | | |
|---|---|---|---|
| 7,899,073 | B2 | 3/2011 | Laroia et al. |
| 2009/0067448 | A1* | 3/2009 | Stanwood ............. H04L 12/413 370/447 |
| 2009/0146866 | A1* | 6/2009 | Matsumoto ........... H04W 16/14 342/52 |
| 2010/0173586 | A1* | 7/2010 | McHenry ............ H04L 27/0006 455/62 |
| 2010/0225530 | A1 | 9/2010 | Lin et al. |
| 2010/0303024 | A1* | 12/2010 | Gossain ................ H04W 72/04 370/329 |
| 2012/0113918 | A1 | 5/2012 | Freda et al. |
| 2012/0140646 | A1 | 6/2012 | Stephens |
| 2012/0258749 | A1* | 10/2012 | Lenzini ................ H04W 16/14 455/509 |
| 2013/0039200 | A1 | 2/2013 | Park et al. |
| 2013/0194944 | A1 | 8/2013 | Soyak et al. |
| 2013/0252640 | A1 | 9/2013 | Kenney et al. |
| 2013/0322235 | A1 | 12/2013 | Khoryaev et al. |
| 2014/0036814 | A1* | 2/2014 | Zhang ............... H04W 72/1294 370/329 |
| 2014/0170985 | A1 | 6/2014 | Raghavan et al. |
| 2014/0177468 | A1* | 6/2014 | Kazmi ................ H04L 41/0816 370/254 |
| 2015/0063147 | A1 | 3/2015 | Sadek et al. |

FOREIGN PATENT DOCUMENTS

| | | |
|---|---|---|
| JP | 2015515842 A | 5/2015 |
| WO | 20009009402 | 1/2009 |
| WO | 2013081525 A1 | 6/2013 |
| WO | 2013106740 A2 | 7/2013 |
| WO | 2013108008 A1 | 7/2013 |

\* cited by examiner

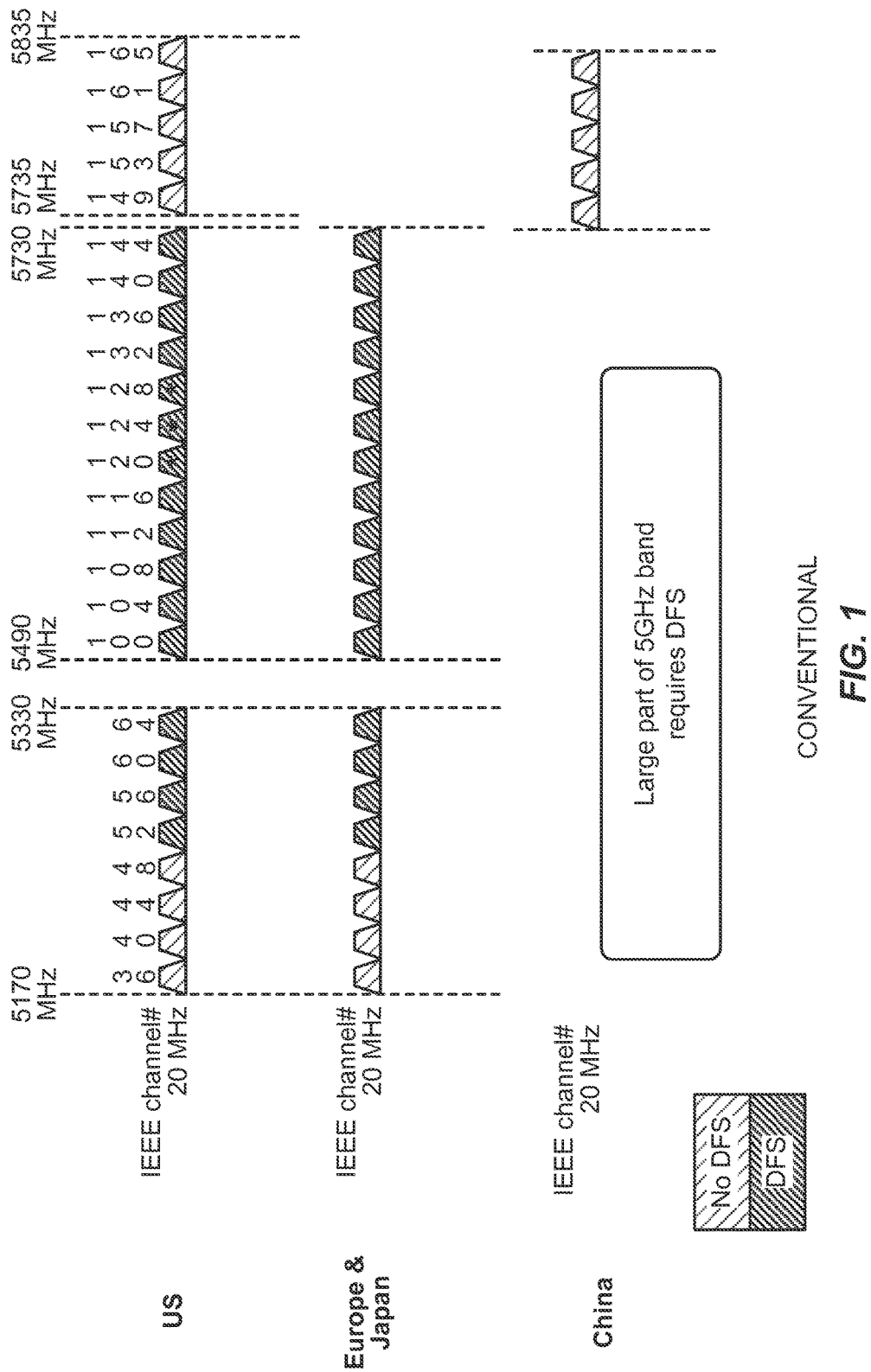
CONVENTIONAL
FIG. 1

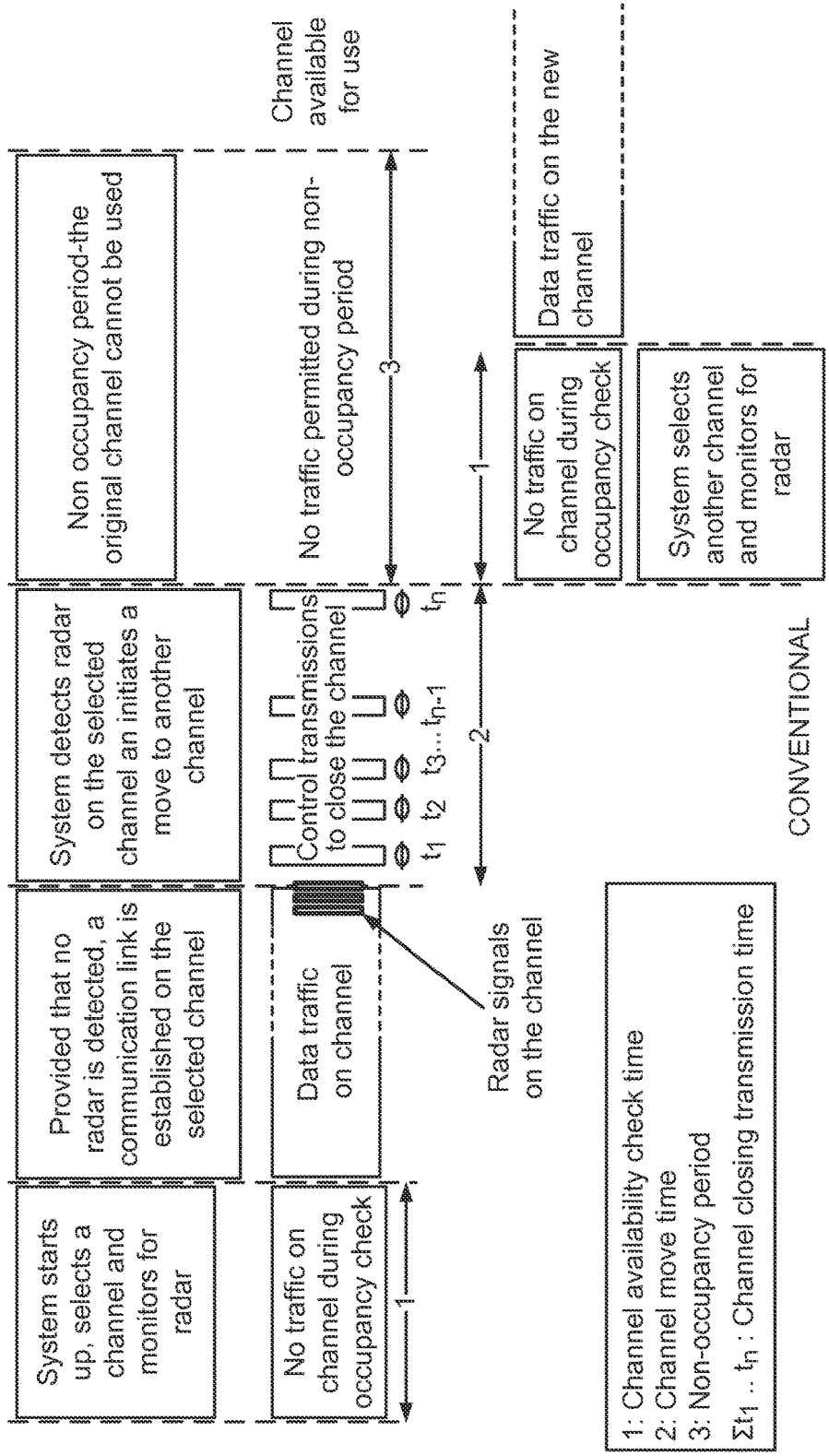
FIG. 2 CONVENTIONAL

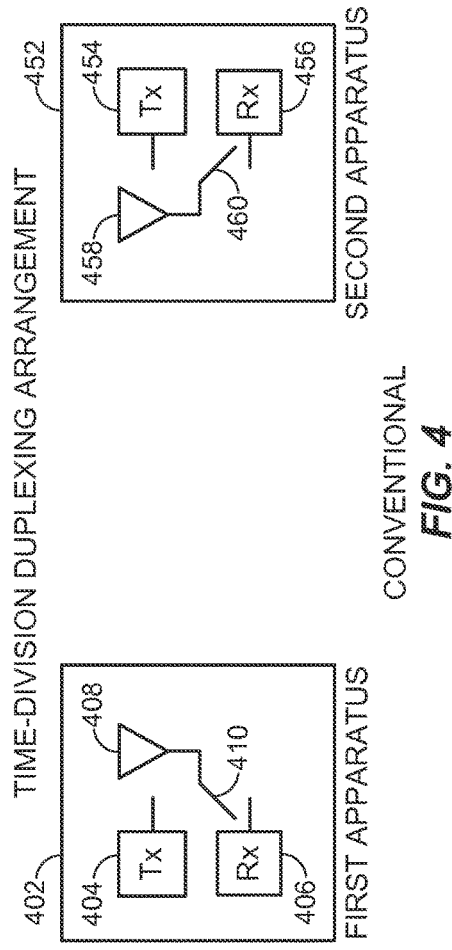
CONVENTIONAL
*FIG. 4*
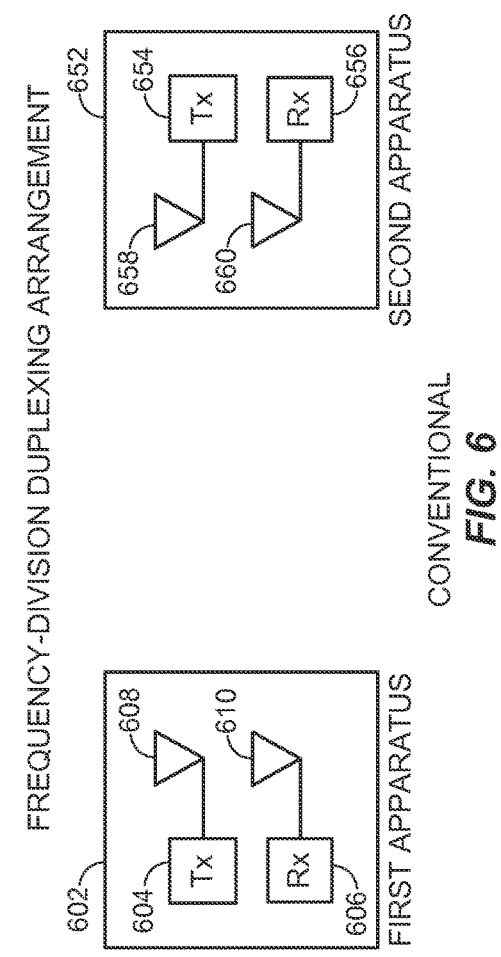
CONVENTIONAL
*FIG. 6*

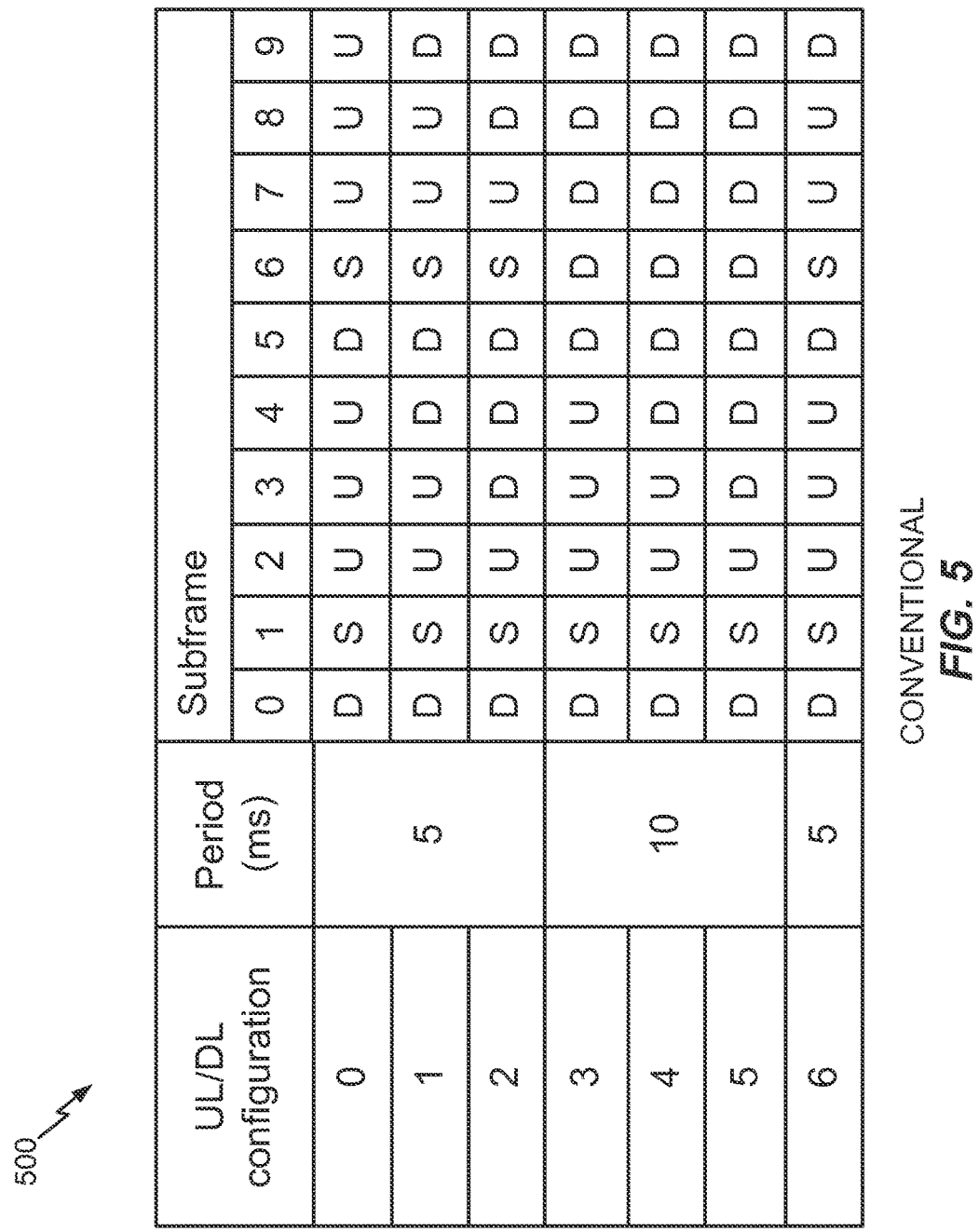
CONVENTIONAL
FIG. 5

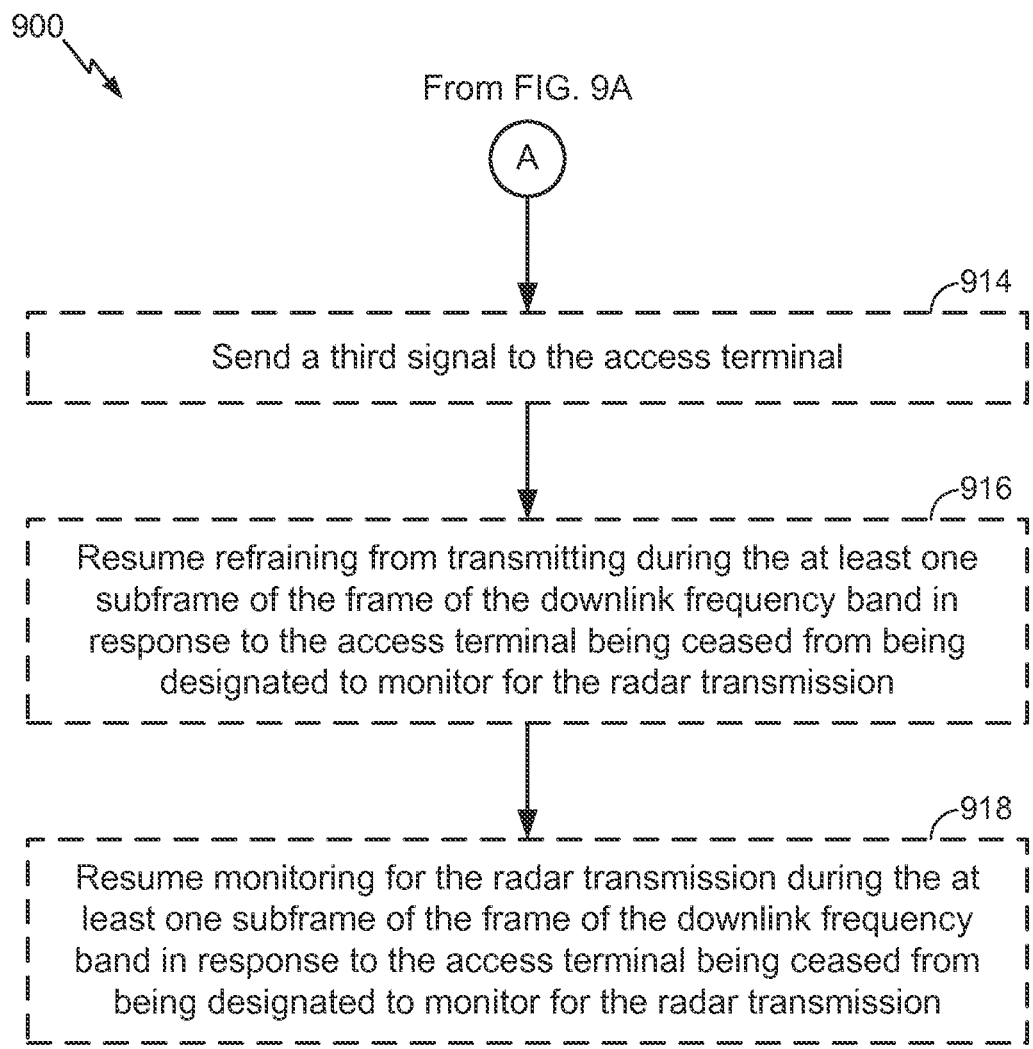

RADAR DETECTION IN WIRELESS NETWORK THAT USES FREQUENCY-DIVISION DUPLEXING

CROSS-REFERENCE TO RELATED APPLICATIONS

The present application for patent claims the benefit of U.S. Provisional Application No. 61/880,148, entitled "Configuring New Subframe Types and/or MBSFN for Efficient Radar Detection in 5 GHz for Frequency Division Duplex (FDD) Systems," filed Sep. 19, 2013, and U.S. Provisional Application No. 61/873,636, entitled "Methods for Radar Detection in Frequency Division Duplex (FDD) Systems," filed Sep. 4, 2013, each of which is assigned to the assignee hereof, and expressly incorporated herein by reference in its entirety.

REFERENCE TO CO-PENDING APPLICATIONS FOR PATENT

The present Application for Patent is related to co-pending U.S. patent application Ser. No. 14/473,454, entitled "MANAGING RADAR DETECTION IN WIRELESS NETWORK THAT USES FREQUENCY-DIVISION DUPLEXING", filed concurrently herewith, assigned to the assignee hereof, and expressly incorporated herein by reference in its entirety.

INTRODUCTION

Aspects of this disclosure generally relate to radar detection in a wireless network that uses frequency-division duplexing, and more particularly to radar detection in a wireless network that uses frequency-division duplexing in the 5 GHz band.

A wireless communication network may be deployed to provide various types of services (e.g., voice, data, multimedia services, etc.) to users within a coverage area of the network. In some implementations, one or more access points (e.g., corresponding to different cells) provide wireless connectivity for access terminals (e.g., cell phones) that are operating within the coverage of the access point(s). In some implementations, peer devices provide wireless connectivity for communicating with one another.

Communication between devices in a wireless communication network may be subject to interference. For a communication from a first network device to a second network device, emissions of Radio Frequency (RF) energy by a nearby device may interfere with reception of signals at the second network device. For example, some wireless communication bands (e.g., a 5 GHz band or other bands) are subject to interference from radar systems operating within those bands.

Over-the-air radar detection is employed in some wireless communication networks in an attempt to mitigate radar interference. For example, an Unlicensed National Information Infrastructure (U-NII) network may employ a Dynamic Frequency Selection (DFS) function to: detect and avoid co-channel operation with radar systems; and provide, on aggregate, a uniform spreading of the operating channels across the entire band.

A U-NII device may operate in Master Mode or Client Mode. A Master initiates a U-NII network by transmitting control signals that can enable other U-NII devices to associate with the Master. A Client operates in a network controlled by a U-NII device operating in Master Mode.

FIG. 1 illustrates an example of channel availability and DFS requirements for several 5 GHz bands. For the U.S., Europe, and Japan, DFS is employed on channels 52-144. DFS might not be employed on the other channels.

In a U-NII network, radar detection is employed in certain channels in the 5 GHz band. A device and/or network operating on a channel where radar detection is called for can repeatedly (e.g., continually) monitor that channel (and, optionally, other available channels) for radar signals. In the event radar is detected, transmission is stopped.

FIG. 2 illustrates an example of a DFS sequence. These operations may be employed, for example, to detect radar waveforms having a received signal strength above a DFS Detection Threshold (e.g., −62 dBm).

Table 1 illustrates an example of DFS Response Requirement Values.

TABLE 1

| Parameter | Value |
| --- | --- |
| Non-Occupancy Period | Minimum 30 minutes |
| Channel Availability Check Time | 60 seconds. |
| Channel Move Time | 10 seconds (see Note 1) |
| Channel Closing Transmission Time | 20 milliseconds + an aggregate of 60 milliseconds over remaining 10 second period (see Note 1 & 2) |
| U-NII Detection Bandwidth | Minimum 80% of the U-NII 99% transmission power bandwidth (see Note 3) |

Note 1:
The instant that the Channel Move Time and the Channel Closing Transmission Time begin is as follows: for the Short Pulse Radar Test Signals this instant is the end of the Burst; for the Frequency Hopping Radar Test Signal, this instant is the end of the last radar burst generated; for the Long Pulse Radar Test Signal this instant is the end of the 12 second period defining the Radar Waveform.
Note 2:
The Channel Closing Transmission Time is comprised of 200 milliseconds starting at the beginning of the Channel Move Time plus any additional intermittent control signals required to facilitate a channel move (an aggregate of 60 milliseconds) during the remainder of the 10 second period. The aggregate duration of control signals do not count quiet periods in between transmissions.
Note 3:
During the U-NII Detection Bandwidth detection test, radar type 1 is used. For each frequency step, the minimum percentage of detection is 90 percent. Measurements are performed with no data traffic.

In practice, radar detection by a device may be hampered when the device is communicating with another device. For example, radar detection might not be possible when the device is transmitting. Thus, for technologies such as Long-Term Evolution (LTE) time-division duplexing (TDD) that employ planned transmit and receive times (e.g., time slots) on the same frequency channel, the periods of time available for radar detection may be significantly limited (e.g., limited to those times when a device is not transmitting). For example, if the traffic duty cycle is relatively high (i.e., a high transmit to receive ratio), radar detection may be challenging due to the limited amount of time available to detect radar. Moreover, radar detection may be unreliable even during a receive mode (e.g., in cases where a device is simultaneously receiving data and attempting to detect radar).

SUMMARY

Features and utilities of the disclosure can be achieved by providing a method for detecting, in a wireless network, a radar transmission. The method can include causing an apparatus, configured to communicate with an access terminal in the wireless network and operating in a frequency-division duplexing mode, to refrain from transmitting during at least one subframe of a frame of a downlink frequency band in response to the apparatus being designated to monitor for the radar transmission. The method can also include causing the apparatus to monitor for the radar transmission during the at least one subframe of the frame of the downlink frequency band in response to the apparatus being designated to monitor for the radar transmission.

The apparatus can be configured to perform a function of at least one of an Access Point, a Node B, an Evolved Node B, a radio network controller, a base station, a radio base station, a base station controller, a base transceiver station, a transceiver function, a radio transceiver, a radio router, a basic service set, an extended service set, a macro cell, a macro node, a Home eNB, a femto cell, a femto node, a pico node, a relay node, or a combination thereof.

A placement of the at least one subframe within the frame of the downlink frequency band can correspond to a placement of at least one subframe that is designated for an uplink communication within a frame of a wireless network that uses time-division duplexing. The placement of the at least one subframe that is designated for the uplink communication within the frame of the wireless network that uses time-division duplexing can be in accordance with a predetermined configuration of the frame of the wireless network that uses time-division duplexing. The predetermined configuration can be in accordance with the Long-Term Evolution Time-Division Duplex standard.

A placement of the at least one subframe within the frame of the downlink frequency band can correspond to a placement of at least one subframe that is designated for a transmission in accordance with the Multimedia Broadcast Multicast Service specification.

The method can also include causing the apparatus to send a first signal to the access terminal. The first signal can be configured to cause the access terminal to be designated to monitor for the radar transmission. The method can also include causing the apparatus to receive a second signal from the access terminal in response to a detection of the radar transmission. The method can also include causing the apparatus to reduce an amount of time of refraining from transmitting during the at least one subframe of the frame of the downlink frequency band in response to the access terminal being designated to monitor for the radar transmission. The method can also include causing the apparatus to reduce an amount of time of monitoring for the radar transmission during the at least one subframe of the frame of the downlink frequency band in response to the access terminal being designated to monitor for the radar transmission. The method can also include causing the apparatus to send a second signal to the access terminal. The second signal can be configured to cause the access terminal to cease from being designated to monitor for the radar transmission. The method can also include causing the apparatus to resume refraining from transmitting during the at least one subframe of the frame of the downlink frequency band in response to the access terminal being ceased from being designated to monitor for the radar transmission. The method can also include causing the apparatus to resume monitoring for the radar transmission during the at least one subframe of the frame of the downlink frequency band in response to the access terminal being ceased from being designated to monitor for the radar transmission.

Features and utilities of the disclosure can also be achieved by providing an apparatus for detecting, in a wireless network, a radar transmission. The apparatus can include a switch and a circuit. The switch can be configured to cause a transmitter, operating in a frequency-division duplexing mode, to refrain from transmitting during at least one subframe of a frame of a downlink frequency band in response to the apparatus being designated to monitor for the radar transmission. The apparatus can be configured to communicate with an access terminal in the wireless network. The circuit can be configured to cause the apparatus to monitor for the radar transmission during the at least one subframe of the frame of the downlink frequency band in response to the apparatus being designated to monitor for the radar transmission.

The switch can comprise at least one of a relay, a semiconductor device, or a microelectromechanical switch.

The circuit can include a first antenna and an electronic processor. The first antenna can be configured to receive a first electromagnetic radiation. The electronic processor can be coupled to the first antenna and configured to determine if the first electromagnetic radiation is the radar transmission.

The apparatus can also include a second antenna coupled to the transmitter and configured to transmit a second electromagnetic radiation. The transmitter can be configured to produce the second electromagnetic radiation. In an aspect, the first antenna can be the second antenna and the switch can be configured to be selectively coupled to the electronic processor or selectively coupled to the transmitter.

The circuit can also be configured to send a first signal to the access terminal. The first signal can be configured to cause the access terminal to be designated to monitor for the radar transmission. The circuit can also be configured to receive a second signal from the access terminal in response to a detection of the radar transmission. The circuit can also be configured to cause the apparatus to reduce an amount of time of refraining from transmitting during the at least one subframe of the frame of the downlink frequency band in response to the access terminal being designated to monitor for the radar transmission, and to cause the apparatus to reduce an amount of time of monitoring for the radar transmission during the at least one subframe of the frame of the downlink frequency band in response to the access terminal being designated to monitor for the radar transmission. The circuit can also be configured to cause the apparatus to send a second signal to the access terminal, the second signal configured to cause the access terminal to cease from being designated to monitor for the radar transmission. The circuit can also be configured to cause the apparatus to resume refraining from transmitting during the at least one subframe of the frame of the downlink frequency band in response to the access terminal being ceased from being designated to monitor for the radar transmission, and to cause the apparatus to resume monitoring for the radar transmission during the at least one subframe of the frame of the downlink frequency band in response to the access terminal being ceased from being designated to monitor for the radar transmission.

Features and utilities of the disclosure can also be achieved by providing an apparatus for detecting, in a wireless network, a radar transmission. The apparatus can include means for causing the apparatus, configured to communicate with an access terminal in the wireless network and operating in a frequency-division duplexing mode, to refrain from transmitting during at least one subframe of a frame of a downlink frequency band in response to the apparatus being designated to monitor for the radar transmission. The apparatus can also include means for causing the apparatus to monitor for the radar transmission during the at least one subframe of the frame of the downlink frequency band in response to the apparatus being designated to monitor for the radar transmission.

The apparatus can also include means for causing the apparatus to send a first signal to the access terminal. The first signal can be configured to cause the access terminal to be designated to monitor for the radar transmission. The apparatus can also include means for causing the apparatus to receive a second signal from the access terminal in response to a detection of the radar transmission. The apparatus can also include means for causing the apparatus to send a second signal to the access terminal. The second signal can be configured to cause the access terminal to cease from being designated to monitor for the radar transmission.

Features and utilities of the disclosure can also be achieved by providing a non-transitory computer-readable recording medium for detecting, in a wireless network, a radar transmission. The computer-readable recording medium can include at least one instruction to cause an apparatus, configured to communicate with an access terminal in the wireless network and operating in a frequency-division duplexing mode, to refrain from transmitting during at least one subframe of a frame of a downlink frequency band in response to the apparatus being designated to monitor for the radar transmission. The computer-readable recording medium can also include at least one instruction to cause the apparatus to monitor for the radar transmission during the at least one subframe of the frame of the downlink frequency band in response to the apparatus being designated to monitor for the radar transmission.

The computer-readable recording medium can also include at least one instruction to cause the apparatus to send a first signal to the access terminal. The first signal can be configured to cause the access terminal to be designated to monitor for the radar transmission. The computer-readable recording medium can also include at least one instruction to cause the apparatus to receive a second signal from the access terminal in response to a detection of the radar transmission. The computer-readable recording medium can also include at least one instruction to cause the apparatus to reduce an amount of time of refraining from transmitting during the at least one subframe of the frame of the downlink frequency band in response to the access terminal being designated to monitor for the radar transmission. The computer-readable recording medium can also include at least one instruction to cause the apparatus to reduce an amount of time of monitoring for the radar transmission during the at least one subframe of the frame of the downlink frequency band in response to the access terminal being designated to monitor for the radar transmission. The computer-readable recording medium can also include at least one instruction to cause the apparatus to send a second signal to the access terminal. The second signal can be configured to cause the access terminal to cease from being designated to monitor for the radar transmission.

BRIEF DESCRIPTION OF THE DRAWINGS

These and other sample aspects of the disclosure are described in the detailed description and the claims that follow, and in the accompanying drawings.

FIG. 1 is a simplified diagram illustrating an example of DFS in a 5 GHz band.

FIG. 2 is a simplified diagram illustrating an example of a DFS sequence.

FIG. 4 is a diagram of a conventional time-division duplexing arrangement.

FIG. 5 is a diagram of predetermined configurations of a frame in accordance with the Long-Term Evolution Time-Division Duplex standard.

FIG. 6 is a diagram of a conventional frequency-division duplexing arrangement.

FIGS. 9A and 9B are a flowchart of an example of a method for detecting, in a wireless network, a radar transmission according to the disclosure.

Figure 3:
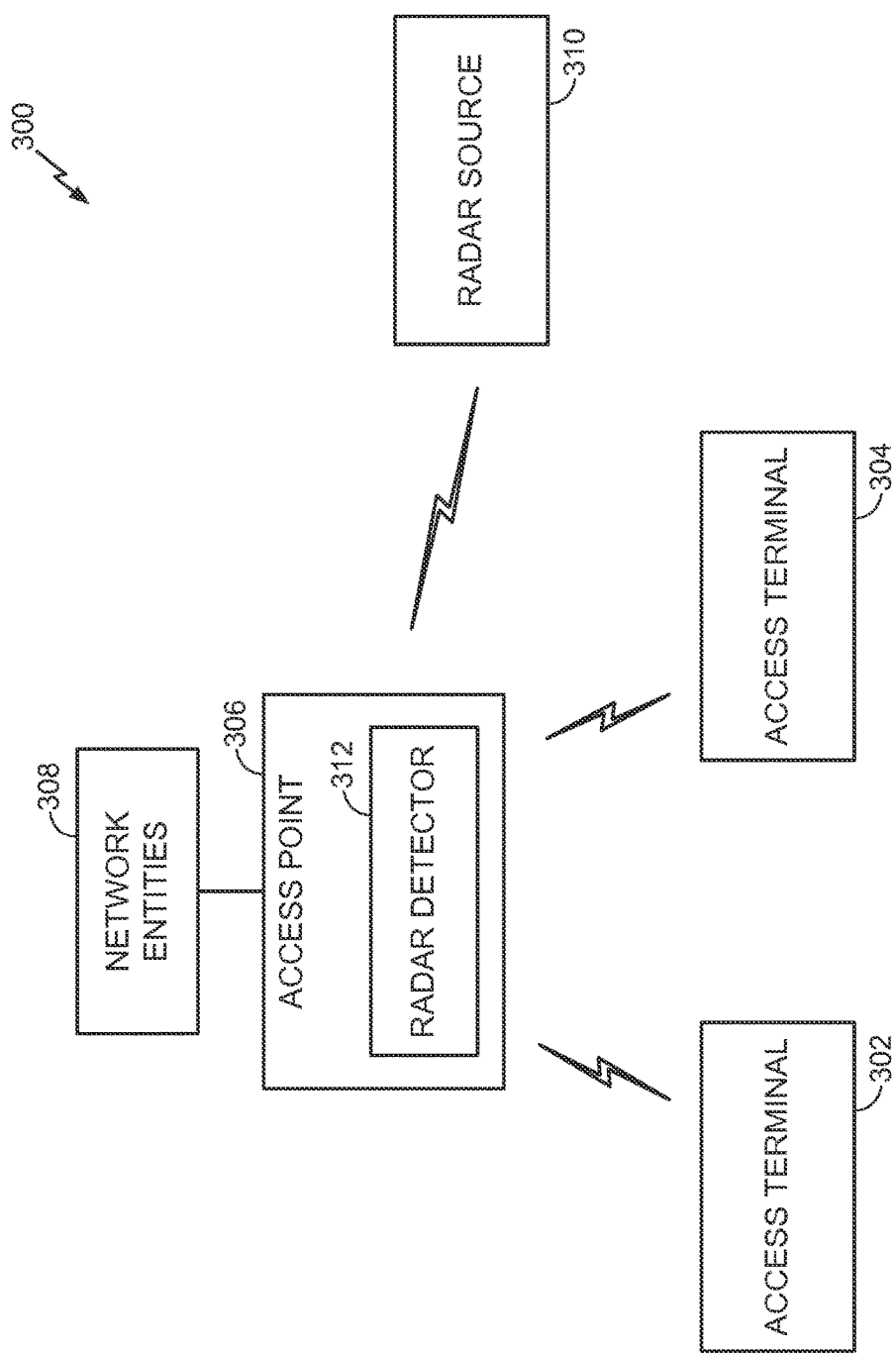
FIG. 3 is a simplified block diagram of several sample aspects of a communication system adapted to support multi-phase radar detection.

In accordance with common practice, the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

Aspects of this disclosure generally relate to radar detection in a wireless network that uses frequency-division duplexing. In general, an apparatus, operating in a frequency-division duplexing mode and configured to communicate with an access terminal in the wireless network, can be caused to refrain from transmitting during at least one subframe of a frame of a downlink frequency band in response to the apparatus being designated to monitor for a radar transmission, and can be caused to monitor for the radar transmission during the at least one subframe of the frame of the downlink frequency band in response to the apparatus being designated to monitor for the radar transmission. Optionally, in a first alternative, a placement of the at least one subframe within the frame of the downlink frequency band can correspond to a placement of at least one subframe that is designated for an uplink communication within a frame of a wireless network that is operating in accordance with the Long-Term Evolution Time-Division Duplex standard. Optionally, in a second alternative, the placement of the at least one subframe within the frame of the downlink frequency band can correspond to a placement of at least one subframe that is designated for a transmission in accordance with the Multimedia Broadcast Multicast Service specification.

More specific aspects of the disclosure are provided in the following description and related drawings directed to various examples provided for illustration purposes. Alternate aspects may be devised without departing from the scope of the disclosure. Additionally, well-known aspects of the disclosure may not be described in detail or may be omitted so as not to obscure more relevant details.

FIG. 3 illustrates several nodes of a sample communication system 300 (e.g., a portion of a communication network). For illustration purposes, various aspects of the disclosure are described in the context of one or more access terminals, access points, and network entities that communicate with one another. It can be appreciated, however, that the teachings herein may be applicable to other types of apparatuses or other similar apparatuses that are referenced using other terminology. For example, in various implementations access points may be referred to or implemented as base stations, NodeBs, eNodeBs, Home NodeBs, Home eNodeBs, small cells, macro cells, femto cells, and so on, while access terminals may be referred to or implemented as user equipment (UEs), mobile stations, and so on.

Access points in the system 300 provide access to one or more services (e.g., network connectivity) for one or more wireless terminals (e.g., the access terminal 302 or the access terminal 304) that may be installed within or that may roam throughout a coverage area of the system 300. For example, at various points in time the access terminal 302 may connect to the access point 306 or some other access point in the system 300 (not shown). Similarly, the access terminal 304 may connect to the access point 306 or some other access point.

Each of the access points may communicate with one or more network entities (represented, for convenience, by the network entities 308), including each other, to facilitate wide area network connectivity. Two or more of such network entities may be co-located and/or two or more of such network entities may be distributed throughout a network.

A network entity may take various forms such as, for example, one or more radio and/or core network entities. Thus, in various implementations the network entities 308 may represent functionality such as at least one of: network management (e.g., via an operation, administration, management, and provisioning entity), call control, session management, mobility management, gateway functions, interworking functions, or some other suitable network functionality. In some aspects, mobility management relates to: keeping track of the current location of access terminals through the use of tracking areas, location areas, routing areas, or some other suitable technique; controlling paging for access terminals; and providing access control for access terminals.

As indicated above with reference to FIG. 3, reception of wireless signals at the access point 306 (or any other devices in the system 300) may be subjected to interference from a radar source 310. In accordance with the teachings herein, the access point 306 includes a radar detector 312 that provides radar detection.

In some implementations, the radar detector 312 employs a radar detection algorithm including an initial detection (e.g., pre-detection) phase and a final detection phase. The initial detection phase determines whether the access point 306 has received a potential radar signal. For example, the radar detector 312 may repeatedly (e.g., periodically) sample received signals and process those signals in an efficient manner to make a preliminary determination as to whether the received signals are radar signals. If the received signals appear to be radar signals, the final detection phase is invoked. During this latter phase, a more robust analysis of received signals is performed in an attempt to determine, with more certainty, whether the access point 306 is in fact receiving radar signals. As discussed herein, to facilitate the more accurate radar detection of the final phase, transmissions of the access point 306 and/or any devices associated with the access point 306 (e.g., the access terminals 302 and 304) may be limited.

In the example of FIG. 3, the access point 306 is depicted as including the radar detector 312. In different implementations, some or all of the functionality of the radar detector 312 may be embodied in different entities. For example, in some implementations, an access terminal may employ radar detection.

FIG. 4 is a diagram of a conventional time-division duplexing arrangement 400. The arrangement 400 includes a first apparatus 402 and a second apparatus 452. The first apparatus 402 includes a transmitter 404, a receiver 406, an antenna 408, and a switch 410. The second apparatus 452 includes a transmitter 454, a receiver 456, an antenna 458, and a switch 460. With time-division duplexing, communications from the first apparatus 402 to the second apparatus 452 and from the second apparatus 452 to the first apparatus 402 are performed at the same carrier frequency. Communications are parsed into units of amounts of data per interval of time. Such a unit is known as a frame. The frame itself is parsed into a number of subframes. With time-division duplexing, communication occurs in a first direction (e.g., from the first apparatus 402 to the second apparatus 452) during a first subframe, and in a second direction (e.g., from the second apparatus 452 to the first apparatus 402) during a second subframe.

For example, during the first subframe, the switch 410 couples the transmitter 404 to the antenna 408 and the switch 460 couples the receiver 456 to the antenna 458 so that communication occurs in the first direction from the first apparatus 402 to the second apparatus 452. If the first apparatus 402 is configured to perform a function of at least one of an Access Point, a Node B, an Evolved Node B, a radio network controller, a base station, a radio base station, a base station controller, a base transceiver station, a transceiver function, a radio transceiver, a radio router, a basic service set, an extended service set, a macro cell, a macro node, a Home eNB, a femto cell, a femto node, a pico node, a relay node, or the like, and the second apparatus 452 is an access terminal or the like, then the communication in the first direction is known as a downlink.

For example, during the second subframe, the switch 410 couples the receiver 406 to the antenna 408 and the switch 460 couples the transmitter 454 to the antenna 458 so that the communication occurs in the second direction from the second apparatus 452 to the first apparatus 402. If the first apparatus 402 is configured to perform a function of at least one of an Access Point, a Node B, an Evolved Node B, a radio network controller, a base station, a radio base station, a base station controller, a base transceiver station, a transceiver function, a radio transceiver, a radio router, a basic service set, an extended service set, a macro cell, a macro node, a Home eNB, a femto cell, a femto node, a pico node, a relay node, or the like, then the communication in the second direction is known as an uplink.

FIG. 5 is a diagram 500 of predetermined configurations of a frame in accordance with the Long-Term Evolution (LTE) Time-Division Duplex (TDD) standard. Each frame in the LTE TDD standard includes 10 subframes (i.e., subfames 0 through 9). The LTE TDD standard provides for seven configurations (i.e., configurations 0 through 6) of a frame based on the designated direction of communication during the subframes. For example, in configuration 0 of the LTE TDD standard, subframes 0 and 5 are designated for communications in the downlink (D) direction, subframes 2, 3, 4, 7, 8, and 9 are designated for communications in the uplink (U) direction, and subframes 1 and 6 are designated as special subframes. Likewise, for example, in configuration 1 of the LTE TDD standard, subframes 0, 4, 5, and 9 are designated for communications in the downlink (D) direction, subframes 2, 3, 7, and 8 are designated for communications in the uplink (U) direction, and subframes 1 and 6 are designated as special subframes.

With reference to the conventional time-division duplexing arrangement 400 illustrated in FIG. 4 and configuration 0 of the LTE TDD standard of the diagram 500 illustrated in FIG. 5, for example, during subframe 4 (U), the switch 410 couples the receiver 406 to the antenna 408 and the switch 460 couples the transmitter 454 to the antenna 458 so that the communication occurs from the second apparatus 452 to the first apparatus 402 in the uplink direction. For example, during subframe 5 (D), the switch 410 couples the transmitter 404 to the antenna 408 and the switch 460 couples the receiver 456 to the antenna 458 so that communication occurs from the first apparatus 402 to the second apparatus 452 in the downlink direction.

FIG. 6 is a diagram of a conventional frequency-division duplexing arrangement 600. The arrangement 600 includes a first apparatus 602 and a second apparatus 652. The first apparatus 602 includes a transmitter 604, a receiver 606, a first antenna 608, and a second antenna 610. The second apparatus 652 includes a transmitter 654, a receiver 656, a first antenna 658, and a second antenna 660. With frequency-division duplexing, communication from the first apparatus 602 to the second apparatus 652 is performed at a first carrier frequency, and communication from the second apparatus 652 to the first apparatus 602 is performed at a second carrier frequency. With frequency-division duplexing, communications occur concurrently in a first direction (e.g., from the first wireless apparatus 602 to the second wireless apparatus 652) and in a second direction (e.g., from the second wireless apparatus 652 to the first wireless apparatus 602). Nevertheless, communications are still parsed into frames, which themselves are parsed into subframes.

For example, communication in the first direction occurs at the first carrier frequency from the transmitter 604 through the first antenna 608 to the receiver 656 through the second antenna 660, and concurrently communication in the second direction occurs at the second carrier frequency from the transmitter 654 through the first antenna 658 to the receiver 606 through the second antenna 610. If the first apparatus 602 is configured to perform a function of at least one of an Access Point, a Node B, an Evolved Node B, a radio network controller, a base station, a radio base station, a base station controller, a base transceiver station, a transceiver function, a radio transceiver, a radio router, a basic service set, an extended service set, a macro cell, a macro node, a Home eNB, a femto cell, a femto node, a pico node, a relay node, or the like, and the second apparatus 652 is an access terminal or the like, then the communication in the first direction is known as a downlink and the first carrier frequency defines a downlink frequency band. If the first apparatus 602 is configured to perform a function of at least one of an Access Point, a Node B, an Evolved Node B, a radio network controller, a base station, a radio base station, a base station controller, a base transceiver station, a transceiver function, a radio transceiver, a radio router, a basic service set, an extended service set, a macro cell, a macro node, a Home eNB, a femto cell, a femto node, a pico node, a relay node, or the like, and the second apparatus 652 is an access terminal or the like, then the communication in the second direction is known as an uplink and the second carrier frequency defines an uplink frequency band.

One of skill in the art recognizes that, in practice, a wireless network typically experiences a significantly greater amount of data flow in the downlink direction than in the uplink direction. This complicates the ability of a wireless communication system, operating in a frequency-division duplexing mode, to implement Dynamic Frequency Selection (DFS) to detect the presence of radar transmissions in the downlink frequency band.

Figure 7:
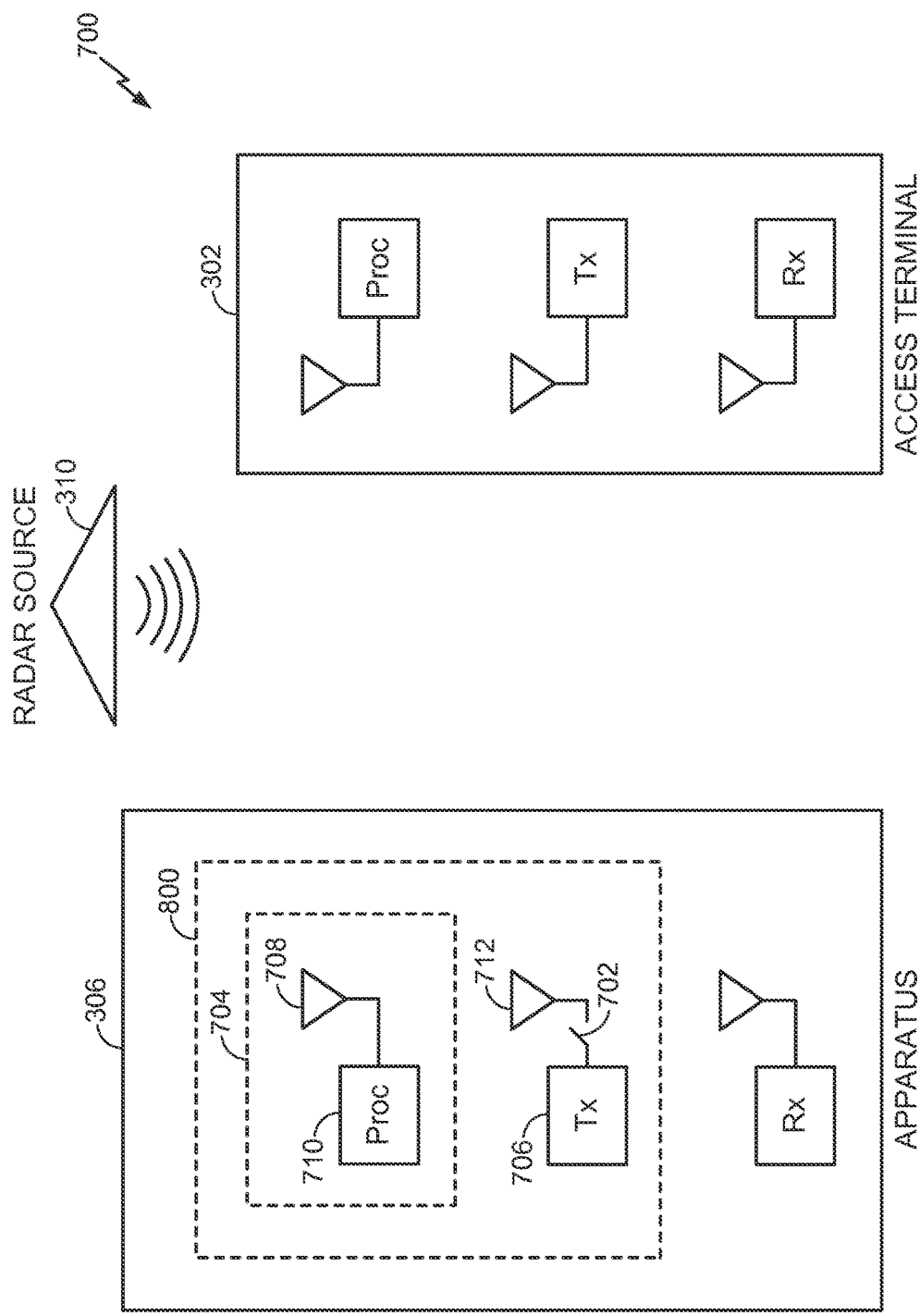
FIG. 7 is a diagram of an example of an apparatus for detecting, in a wireless network, a radar transmission according to the disclosure.

FIG. 7 is a diagram of an example of the apparatus 306 for detecting, in a wireless network 700, a transmission from the radar source 310 according to the disclosure. The wireless network 700 can also include the access terminal 302. The apparatus 306 can include a switch 702 and a circuit 704. The switch 702 can be configured to cause a transmitter 706, operating in a frequency-division duplexing mode, to refrain from transmitting during at least one subframe of a frame of a downlink frequency band in response to the apparatus 306 being designated to monitor for the transmission from the radar source 310. For example, the switch 702 can be placed in an open position during the at least one subframe of the frame of the downlink frequency band. The apparatus 306 can be configured to communicate with the access terminal 302 in the wireless network 700. The circuit 704 can be configured to cause the apparatus 306 to monitor for the transmission from the radar source 310 during the at least one subframe of the frame of the downlink frequency band in response to the apparatus 306 being designated to monitor for the transmission from the radar source 310.

The switch 702 can comprise, for example, a relay, a semiconductor device, a microelectromechanical switch, or a combination of these devices. One of skill in the art understands other manners in which the transmitter 706 can be caused to refrain from transmitting during at least one subframe of a frame of a downlink frequency band such that the implementation of the apparatus 306 can be accomplished without the switch 702. For example, one of skill in the art understands that the transmitter 706 modulates an input signal (not illustrated) prior to transmission and that the transmitter 706 can be caused to refrain from transmitting during the at least one subframe of the frame of the downlink frequency band by preventing the input signal from being input to the transmitter 706 during this period or by preventing the input signal from being modulated by the transmitter 706 during this period.

The circuit 704 can include, for example, the radar detector 312 of communication system 300. The circuit 704 can include, for example, a first antenna 708 and an electronic processor 710. The first antenna 708 can be configured to receive a first electromagnetic radiation. The electronic processor 710 can be coupled to the first antenna 708 and can be configured to determine if the first electromagnetic radiation is the transmission from the radar source 310. Radar transmissions can be classified into different types characterized, for example, by their pulse widths, pulse repetition interval, and the number of pulses transmitted within a certain period of time. One of skill in the art understands other features by which radar transmissions can be classified. The electronic processor 710 can include, for example, a digital signal processor configured to determine if there is a match between the characteristics of the first electromagnetic radiation and the characteristics of various radar types. If there is a match, the electronic processor 710 can determine, for example, if the power level of the first electromagnetic radiation exceeds a threshold value. If the power level of the first electromagnetic radiation exceeds the threshold value, the electronic processor 710 can cause, for example, the apparatus 306 to change the downlink communication to a different channel as required by Dynamic Frequency Selection (DFS).

The apparatus 306 can further include a second antenna 712. The second antenna 712 can be coupled to the transmitter 706 and can be configured to transmit a second electromagnetic radiation. The transmitter 706 can be configured to produce the second electromagnetic radiation.

Figure 8:
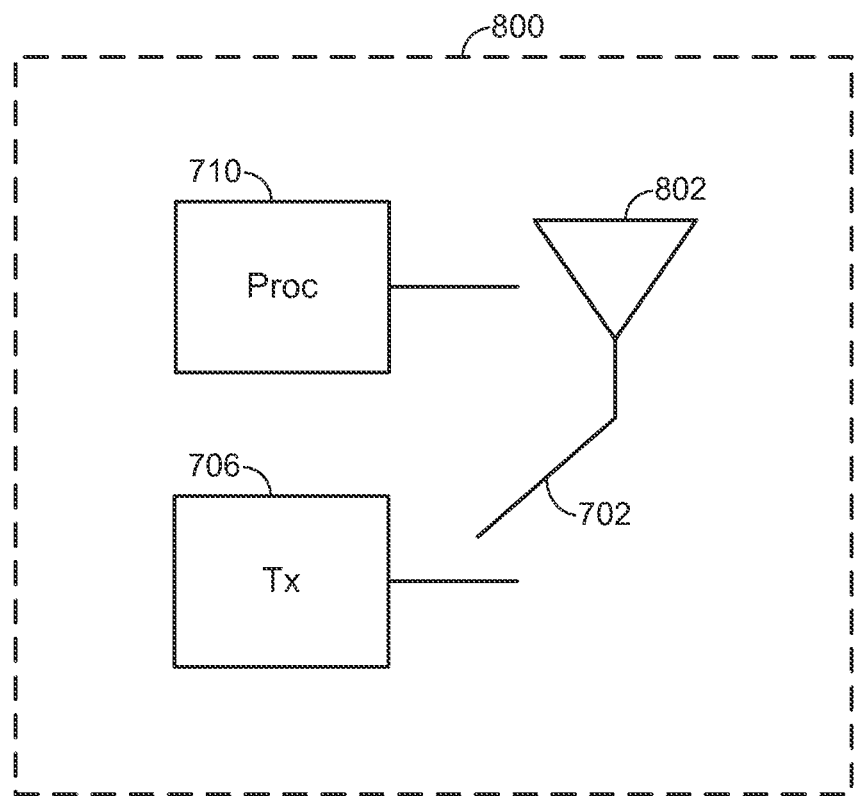
FIG. 8 is a diagram illustrating an example of an alternative arrangement to realize the functions of the switch, the transmitter, the first antenna, the electronic processor, and the second antenna illustrated in FIG. 7.

FIG. 8 is a diagram illustrating an example of an alternative arrangement 800 to realize the functions of the switch 702, the transmitter 706, the first antenna 708, the electronic processor 710, and the second antenna 712 illustrated in FIG. 7. In the alternative arrangement 800, the functions of the first antenna 708 and the second antenna 712 can be realized by a single antenna 802 and the switch 702 can be configured to be selectively coupled to the electronic processor 710 or selectively coupled to the transmitter 706. Thus, the switch 702 can be coupled to the electronic processor 710 during the at least one subframe of the frame of the downlink frequency band so that the apparatus 306 can monitor for the transmission from the radar source 310 during this period, and otherwise can be coupled to the transmitter 706.

Optionally, monitoring for the transmission from the radar source 310 can be transferred from the apparatus 306 to the access terminal 302. For example, the circuit 704 can be further configured to send a first signal to the access terminal 302. The first signal can be configured to cause the access terminal 302 to be designated to monitor for the transmission from the radar source 310. According to this aspect, monitoring for the transmission from the radar source 310 can be performed by both the apparatus 306 and the access terminal 302 or can be performed by the access terminal 302 only. If the wireless network 700 includes more than one access terminal (e.g., access terminal 302, access terminal 304, etc.), then monitoring for the transmission from the radar source 310 can be performed by one or more of the access terminals including one, some, or all of the access terminals in the wireless network 700.

Also according to this aspect, the circuit 704 can be further configured to receive a second signal from the access terminal 302 in response to a detection of the transmission from the radar source 310. The second signal can cause the apparatus 306 to change the downlink communication to a different channel as required by Dynamic Frequency Selection (DFS).

If monitoring for the transmission from the radar source 310 is performed by the access terminal 302 only (or by a group of access terminals), then the circuit 704 can be further configured to cause the apparatus 306 to reduce an amount of time of refraining from transmitting during the at least one subframe of the frame of the downlink frequency band in response to the access terminal 302 being designated to monitor for the transmission from the radar source 310. The circuit 704 can be further configured to cause the apparatus 306 to reduce an amount of time of monitoring for the transmission from the radar source 310 during the at least one subframe of the frame of the downlink frequency band in response to the access terminal 306 being designated to monitor for the transmission from the radar source 310. For example, in response to the access terminal 306 being designated to monitor for the transmission from the radar source 310, the switch 702 can be placed in a closed position for all subframes so that the downlink frequency band is used for usual downlink communication.

Regardless of whether monitoring for the transmission from the radar source 310 is performed by both the apparatus 306 and the access terminal 302 or is performed by the access terminal 302 only (or by a group of access terminals), the circuit 704 can be further configured to cause the apparatus 306 to send a third signal to the access terminal 302. The third signal can be configured to cause the access terminal 302 to cease from being designated to monitor for the transmission from the radar source 310.

According to this aspect, the circuit 704 can be further configured to cause the apparatus 306 to resume refraining from transmitting during the at least one subframe of the frame of the downlink frequency band in response to the access terminal 302 being ceased from being designated to monitor for the transmission from the radar source 310. The circuit 704 can be further configured to cause the apparatus 306 to resume monitoring for the transmission from the radar source 310 during the at least one subframe of the frame of the downlink frequency band in response to the access terminal 302 being ceased from being designated to monitor for the transmission from the radar source 310.

Figure 9A:
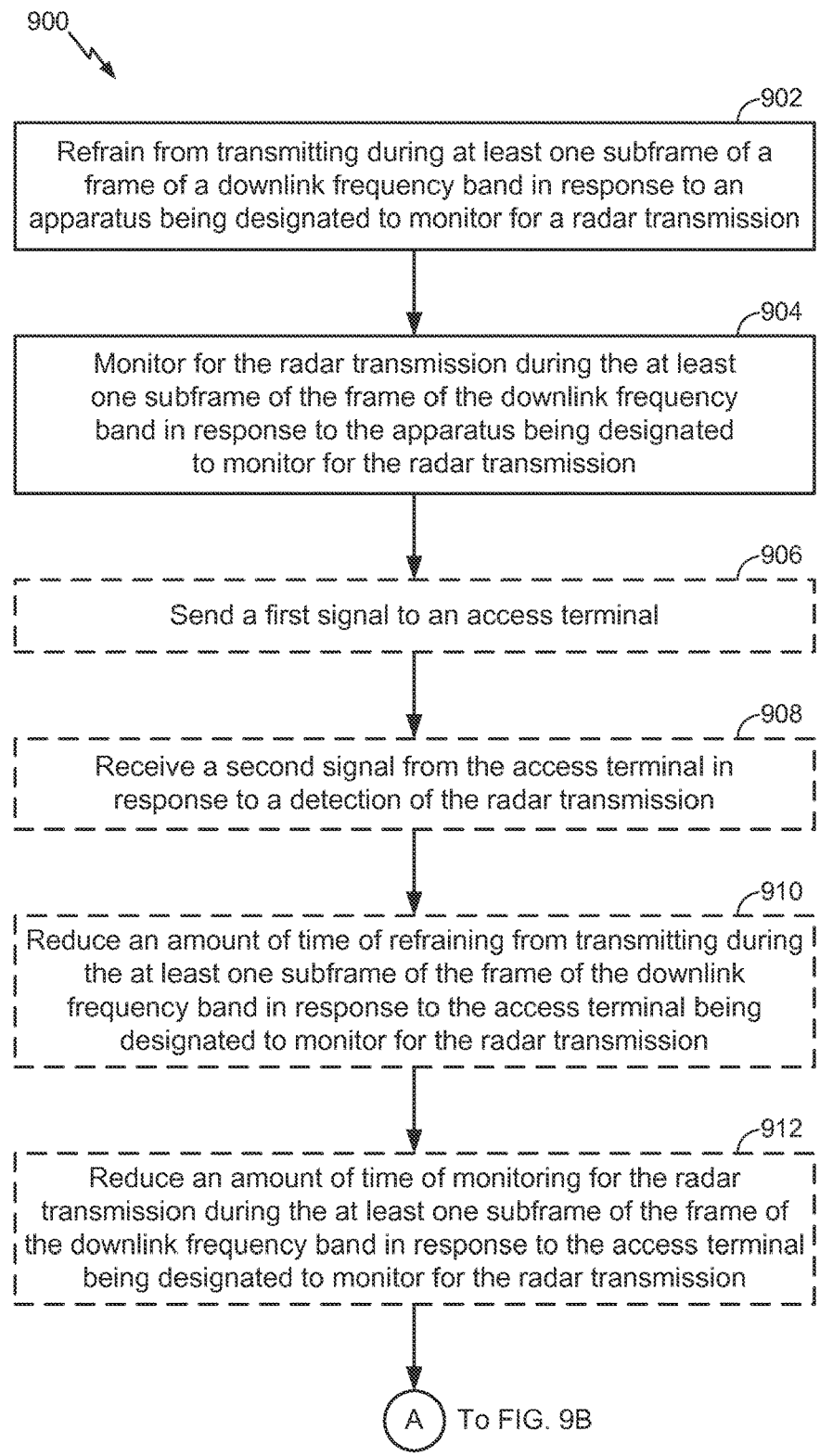

FIGS. 9A and 9B are a flowchart of an example of a method 900 for detecting, in a wireless network, a radar transmission according to the disclosure. In FIGS. 9A and 9B, optional operations of the method 900 are illustrated in dashed blocks. In the method 900, at an operation 902, an apparatus, configured to communicate with an access terminal in the wireless network and operating in a frequency-division duplexing mode, can be caused to refrain from transmitting during at least one subframe of a frame of a downlink frequency band in response to the apparatus being designated to monitor for the radar transmission. For example, with reference to FIG. 7, the apparatus 306, configured to communicate with the access terminal 306 in the wireless network 700 and operating in a frequency-division duplexing mode, can be caused to refrain from transmitting during at least one subframe of a frame of a downlink frequency band in response to the apparatus 306 being designated to monitor for the transmission from the radar source 310. For example, the switch 702 can be placed in the open position during the at least one subframe of the frame of the downlink frequency band.

Returning to FIG. 9A, at an operation 904, the apparatus can be caused to monitor for the radar transmission during the at least one subframe of the frame of the downlink frequency band in response to the apparatus being designated to monitor for the radar transmission. For example, with reference to FIG. 7, the apparatus 306 can be caused to monitor for the transmission from the radar source 310 during the at least one subframe of the frame of the downlink frequency band in response to the apparatus 306 being designated to monitor for the transmission from the radar source 310. For example, the first antenna 708 can be configured to receive an electromagnetic radiation, and the electronic processor 710 can be coupled to the first antenna 708 and can be configured to determine if the electromagnetic radiation is the transmission from the radar source 310.

One of skill in the art understands, by way of example and not by way of limitation, that a non-transitory computer-readable recording medium can contain at least one instruction to cause an electronic processor to perform the operations 902 and 904.

For example, the apparatus can be configured to perform a function of at least one of an Access Point, a Node B, an Evolved Node B, a radio network controller, a base station, a radio base station, a base station controller, a base transceiver station, a transceiver function, a radio transceiver, a radio router, a basic service set, an extended service set, a macro cell, a macro node, a Home eNB, a femto cell, a femto node, a pico node, a relay node, or the like.

Although implementation of the disclosure does not depend upon a particular placement of the at least one subframe within the frame of the downlink frequency band, certain advantages may be realized from doing so.

For example, a placement of the at least one subframe within the frame of the downlink frequency band can correspond to a placement of at least one subframe that is designated for an uplink communication within a frame of a wireless network that uses time-division duplexing. For example, the placement of the at least one subframe that is designated for the uplink communication within the frame of the wireless network that uses time-division duplexing can be in accordance with a predetermined configuration of the frame of the wireless network that uses time-division duplexing. For example, the predetermined configuration can be in accordance with the Long-Term Evolution (LTE) Time-Division Duplex (TDD) standard. One of skill in the art recognizes the benefits and drawbacks of each of time-division duplexing and frequency-division duplexing. Moreover, because each of these modes has specific benefits, the LTE standard incorporates processes for wireless systems that can operate in both modes. Advantageously, having the placement of the at least one subframe within the frame of the downlink frequency band correspond to the placement the placement of the at least one subframe that is designated for the uplink communication in accordance with the LTE TDD standard facilitates operating in both the time-division duplexing and the frequency-division duplexing modes.

Alternatively, for example, a placement of the at least one subframe within the frame of the downlink frequency band can correspond to a placement of at least one subframe that is designated for a transmission in accordance with the Multimedia Broadcast Multicast Service (MBMS) specification. The MBMS specification allows cellular networks to support the efficient delivery of broadcast and multicast signals (e.g., television programs). MBMS uses a Multicast-Broadcast Single-Frequency Network (MBSFN) in which several apparatuses that perform the function of an Evolved Node B are synchronized to support the broadcast or multicast signal. In implementation, the MBSFN uses some subframes within a frame to perform synchronization and other functions, and uses the remaining subframes within the frame to transmit the broadcast or multicast signal. Accordingly, the MBSFN environment supports another implementation of the disclosure in which a placement of the at least one subframe within the frame of the downlink frequency band can correspond to a placement of at least one subframe that is designated for a transmission in accordance with the MBMS specification, but the apparatus monitors for the radar transmission 675 during this subframe rather than transmitting the broadcast or multicast signal. Advantageously, implementing the apparatus in a MBSFN environment can increase the area in which monitoring for the radar transmission occurs.

Optionally, monitoring for the radar transmission can be transferred to an access terminal. Returning to FIG. 9A, at an operation 906, optionally, the apparatus can be caused to send a first signal to the access terminal. The first signal can be configured to cause the access terminal to be designated to monitor for the radar transmission. According to this aspect, monitoring for the radar transmission can be performed by both the apparatus and the access terminal or can be performed by the access terminal only. If the wireless network includes more than one access terminal, then monitoring for the radar transmission can be performed by one or more access terminal including one, some, or all of the access terminals in the wireless network. For example, with reference to FIG. 7, the apparatus 306 can be caused to send a first signal to the access terminal 302. The first signal can be configured to cause the access terminal 302 to be designated to monitor for the transmission from the radar source 310.

One of skill in the art understands, by way of example and not by way of limitation, that a non-transitory computer-readable recording medium can contain at least one instruction to cause an electronic processor to perform the operation 906.

Returning to FIG. 9A, at an operation 908, optionally, the apparatus can be caused to receive a second signal from the access terminal in response to a detection of the radar transmission. The second signal can cause the apparatus to change the downlink communication to a different channel as required by Dynamic Frequency Selection (DFS). For example, with reference to FIG. 7, the apparatus 306 can be caused to receive a second signal from the access terminal 302 in response to a detection of the transmission from the radar source 310.

One of skill in the art understands, by way of example and not by way of limitation, that a non-transitory computer-readable recording medium can contain at least one instruction to cause an electronic processor to perform the operation 908.

Returning to FIG. 9A, if monitoring for the radar transmission is performed by the access terminal only (or by a group of access terminals), then, at an operation 910, optionally, the apparatus can be caused to reduce an amount of time of refraining from transmitting during the at least one subframe of the frame of the downlink frequency band in response to the access terminal being designated to monitor for the radar transmission. For example, with reference to FIG. 7, the apparatus 306 can be caused to reduce an amount of time of refraining from transmitting during the at least one subframe of the frame of the downlink frequency band in response to the access terminal 302 being designated to monitor for the transmission from the radar source 310. For example, in response to the access terminal 302 being designated to monitor for the transmission from the radar source 310, the switch 702 can be placed in the closed position for all subframes so that the downlink frequency band is used for usual downlink communication.

Returning to FIG. 9A, at an operation 912, optionally, the apparatus can be caused to reduce an amount of time of monitoring for the radar transmission during the at least one subframe of the frame of the downlink frequency band in response to the access terminal being designated to monitor for the radar transmission. For example, with reference to FIG. 7, the apparatus 306 can be caused to reduce an amount of time of monitoring for the transmission from the radar source 310 during the at least one subframe of the frame of the downlink frequency band in response to the access terminal 302 being designated to monitor for the transmission from the radar source 310.

One of skill in the art understands, by way of example and not by way of limitation, that a non-transitory computer-readable recording medium can contain at least one instruction to cause an electronic processor to perform the operations 910 and 912.

In FIG. 9B, regardless of whether monitoring for the radar transmission is performed by both the apparatus and the access terminal or is performed by the access terminal only (or by a group of access terminals), at an operation 914, optionally, the apparatus can be caused to send a third signal to the access terminal. The third signal can be configured to cause the access terminal to cease from being designated to monitor for the radar transmission. For example, with reference to FIG. 7, the apparatus 306 can be caused to send a third signal to the access terminal 302. The third signal can be configured to cause the access terminal 302 to cease from being designated to monitor for the transmission from the radar source 310.

One of skill in the art understands, by way of example and not by way of limitation, that a non-transitory computer-readable recording medium can contain at least one instruction to cause an electronic processor to perform the operation 914.

Returning to FIG. 9B, according to this aspect, at an operation 916, optionally, the apparatus can be caused to resume refraining from transmitting during the at least one subframe of the frame of the downlink frequency band in response to the access terminal being ceased from being designated to monitor for the radar transmission. For example, with reference to FIG. 7, the apparatus 306 can be caused to resume refraining from transmitting during the at least one subframe of the frame of the downlink frequency band in response to the access terminal 302 being ceased from being designated to monitor for the transmission from the radar source 310.

Returning to FIG. 9B, at an operation 918, optionally, the apparatus can be caused to resume monitoring for the radar transmission during the at least one subframe of the frame of the downlink frequency band in response to the access terminal being ceased from being designated to monitor for the radar transmission. For example, with reference to FIG. 7, the apparatus 306 can be caused to resume monitoring for the transmission from the radar source 310 during the at least one subframe of the frame of the downlink frequency band in response to the access terminal 302 being ceased from being designated to monitor for the transmission from the radar source 310.

The functionality described herein (e.g., with regard to one or more of the accompanying figures) may correspond in some aspects to similarly designated "means for" functionality in the appended claims.

Figure 10:
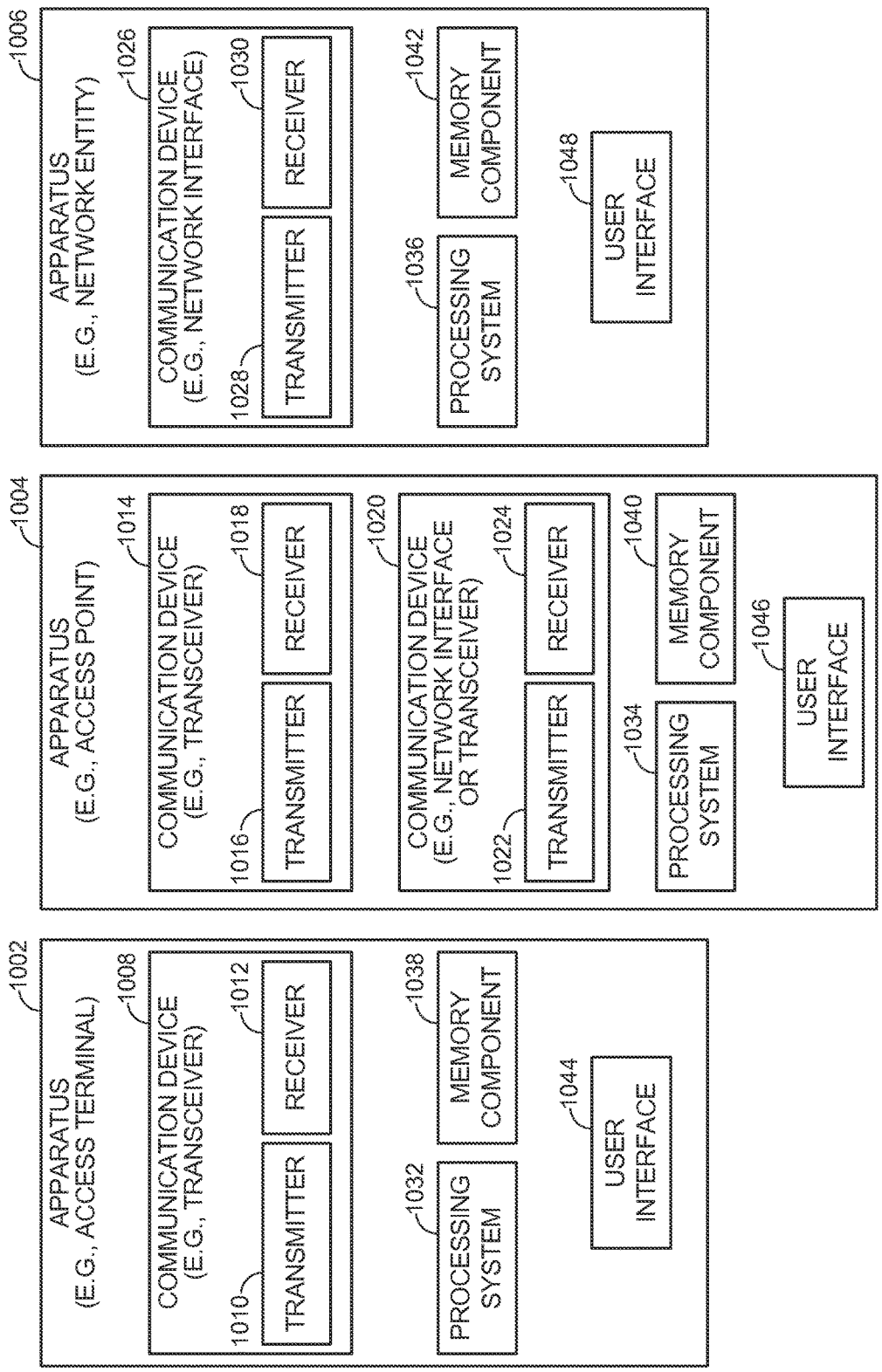
FIG. 10 is a simplified block diagram of several sample aspects of components that may be employed in communication nodes.

FIG. 10 illustrates several sample components (represented by corresponding blocks) that may be incorporated into an apparatus 1002, an apparatus 1004, and an apparatus 1006 (e.g., corresponding to an access terminal, an access point, and a network entity, respectively) to support radar detection operations as taught herein. It can be appreciated that these components may be implemented in different types of apparatuses in different implementations (e.g., in an ASIC, in an SoC, etc.). The described components also may be incorporated into other apparatuses in a communication system. For example, other apparatuses in a system may include components similar to those described to provide similar functionality. Also, a given apparatus may contain one or more of the described components. For example, an apparatus may include multiple transceiver components that enable the apparatus to operate on multiple carriers and/or communicate via different technologies.

The apparatus 1002 and the apparatus 1004 each include at least one wireless communication device (represented by the communication devices 1008 and 1014 (and the communication device 1020 if the apparatus 1004 is a relay)) for communicating with other nodes via at least one designated radio access technology. Each communication device 1008 includes at least one transmitter (represented by the transmitter 1010) for transmitting and encoding signals (e.g., messages, indications, information, and so on) and at least one receiver (represented by the receiver 1012) for receiving and decoding signals (e.g., messages, indications, information, pilots, and so on). Similarly, each communication device 1014 includes at least one transmitter (represented by the transmitter 1016) for transmitting signals (e.g., messages, indications, information, pilots, and so on) and at least one receiver (represented by the receiver 1018) for receiving signals (e.g., messages, indications, information, and so on). If the apparatus 1004 is a relay access point, each communication device 1020 may include at least one transmitter (represented by the transmitter 1022) for transmitting signals (e.g., messages, indications, information, pilots, and so on) and at least one receiver (represented by the receiver 1024) for receiving signals (e.g., messages, indications, information, and so on).

A transmitter and a receiver may comprise an integrated device (e.g., embodied as a transmitter circuit and a receiver circuit of a single communication device) in some implementations, may comprise a separate transmitter device and a separate receiver device in some implementations, or may be embodied in other ways in other implementations. In some aspects, a wireless communication device (e.g., one of multiple wireless communication devices) of the apparatus 1004 comprises a network listen module.

The apparatus 1006 (and the apparatus 1004 if it is not a relay access point) includes at least one communication device (represented by the communication device 1026 and, optionally, 1020) for communicating with other nodes. For example, the communication device 1026 may comprise a network interface that is configured to communicate with one or more network entities via a wire-based or wireless backhaul. In some aspects, the communication device 1026 may be implemented as a transceiver configured to support wire-based or wireless signal communication. This communication may involve, for example, sending and receiving: messages, parameters, or other types of information. Accordingly, in the example of FIG. 10, the communication device 1026 is shown as comprising a transmitter 1028 and a receiver 1030. Similarly, if the apparatus 1004 is not a relay access point, the communication device 1020 may comprise a network interface that is configured to communicate with one or more network entities via a wire-based or wireless backhaul. As with the communication device 1026, the communication device 1020 is shown as comprising a transmitter 1022 and a receiver 1024.

The apparatuses 1002, 1004, and 1006 also include other components that may be used in conjunction with radar detection operations as taught herein. The apparatus 1002 includes a processing system 1032 for providing functionality relating to, for example, radar detection as taught herein and for providing other processing functionality. The apparatus 1004 includes a processing system 1034 for providing functionality relating to, for example, radar detection as taught herein and for providing other processing functionality. The apparatus 1006 includes a processing system 1036 for providing functionality relating to, for example, radar detection as taught herein and for providing other processing functionality. The apparatuses 1002, 1004, and 1006 include memory devices 1038, 1040, and 1042 (e.g., each including a memory device), respectively, for maintaining information (e.g., information indicative of reserved resources, thresholds, parameters, and so on). In addition, the apparatuses 1002, 1004, and 1006 include user interface devices 1044, 1046, and 1048, respectively, for providing indications (e.g., audible and/or visual indications) to a user and/or for receiving user input (e.g., upon user actuation of a sensing device such as a keypad, a touch screen, a microphone, and so on).

For convenience, the apparatus 1002 is shown in FIG. 10 as including components that may be used in the various examples described herein. In practice, the illustrated blocks may have different functionality in different aspects. For example, functionality of the block 1034 for supporting the operation of the switch 702 of FIG. 7 may be different as compared to functionality of the block 1034 for supporting the operation of the switch 702 of FIG. 7.

The components of FIG. 10 may be implemented in various ways. In some implementations, the components of FIG. 10 may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 1008, 1032, 1038, and 1044 may be implemented by processor and memory component(s) of the apparatus 1002 (e.g., by execution of appropriate code and/or by appropriate configuration of processor components). Similarly, some or all of the functionality represented by blocks 1014, 1020, 1034, 1040, and 1046 may be implemented by processor and memory component(s) of the apparatus 1004 (e.g., by execution of appropriate code and/or by appropriate configuration of processor components). Also, some or all of the functionality represented by blocks 1026, 1036, 1042, and 1048 may be implemented by processor and memory component(s) of the apparatus 1006 (e.g., by execution of appropriate code and/or by appropriate configuration of processor components).

As mentioned above, some of the access points referred to herein may comprise small cell access points. As used herein, the term small cell access point refers to an access point having a transmit power (e.g., one or more of: maximum transmit power, instantaneous transmit power, nominal transmit power, average transmit power, or some other form of transmit power) that is less than a transmit power (e.g., as defined above) of any macro access point in the coverage area. In some implementations, each small cell access point has a transmit power (e.g., as defined above) that is less than a transmit power (e.g., as defined above) of the macro access point by a relative margin (e.g., 10 dBm or more). In some implementations, small cell access points such as femto cells may have a maximum transmit power of 20 dBm or less. In some implementations, small cell access points such as pico cells may have a maximum transmit power of 24 dBm or less. It can be appreciated, however, that these or other types of small cell access points may have a higher or lower maximum transmit power in other implementations (e.g., up to 1 Watt in some cases, up to 10 Watts in some cases, and so on).

Typically, small cell access points connect to the Internet via a broadband connection (e.g., a digital subscriber line (DSL) router, a cable modem, or some other type of modem) that provides a backhaul link to a mobile operator's network. Thus, a small cell access point deployed in a user's home or business provides mobile network access to one or more devices via the broadband connection.

Small cells may be configured to support different types of access modes. For example, in an open access mode, a small cell may allow any access terminal to obtain any type of service via the small cell. In a restricted (or closed) access mode, a small cell may only allow authorized access terminals to obtain service via the small cell. For example, a small cell may only allow access terminals (e.g., so called home access terminals) belonging to a certain subscriber group (e.g., a closed subscriber group (CSG)) to obtain service via the small cell. In a hybrid access mode, alien access terminals (e.g., non-home access terminals, non-CSG access terminals) may be given limited access to the small cell. For example, a macro access terminal that does not belong to a small cell's CSG may be allowed to access the small cell only if sufficient resources are available for all home access terminals currently being served by the small cell.

Thus, small cells operating in one or more of these access modes may be used to provide indoor coverage and/or extended outdoor coverage. By allowing access to users through adoption of a desired access mode of operation, small cells may provide improved service within the coverage area and potentially extend the service coverage area for users of a macro network.

Thus, in some aspects the teachings herein may be employed in a network that includes macro scale coverage (e.g., a large area cellular network such as a 3G network, typically referred to as a macro cell network or a wide area network (WAN)) and smaller scale coverage (e.g., a residence-based or building-based network environment, typically referred to as a local area network (LAN)). As an access terminal moves through such a network, the access terminal may be served in certain locations by access points that provide macro coverage while the access terminal may be served at other locations by access points that provide smaller scale coverage. In some aspects, the smaller coverage nodes may be used to provide incremental capacity growth, in-building coverage, and different services (e.g., for a more robust user experience).

In the description herein, a node (e.g., an access point) that provides coverage over a relatively large area may be referred to as a macro access point while a node that provides coverage over a relatively small area (e.g., a residence) may be referred to as a small cell. It can be appreciated that the teachings herein may be applicable to nodes associated with various types of coverage areas. For example, a pico access point may provide coverage (e.g., coverage within a commercial building) over an area that is smaller than a macro area and larger than a femto cell area. In various applications, other terminology may be used to reference a macro access point, a small cell, or other access point-type nodes. For example, a macro access point may be configured or referred to as an access node, base station, access point, eNodeB, macro cell, and so on. In some implementations, a node may be associated with (e.g., referred to as or divided into) one or more cells or sectors. A cell or sector associated with a macro access point, a femto access point, or a pico access point may be referred to as a macro cell, a femto cell, or a pico cell, respectively.

Figure 11:
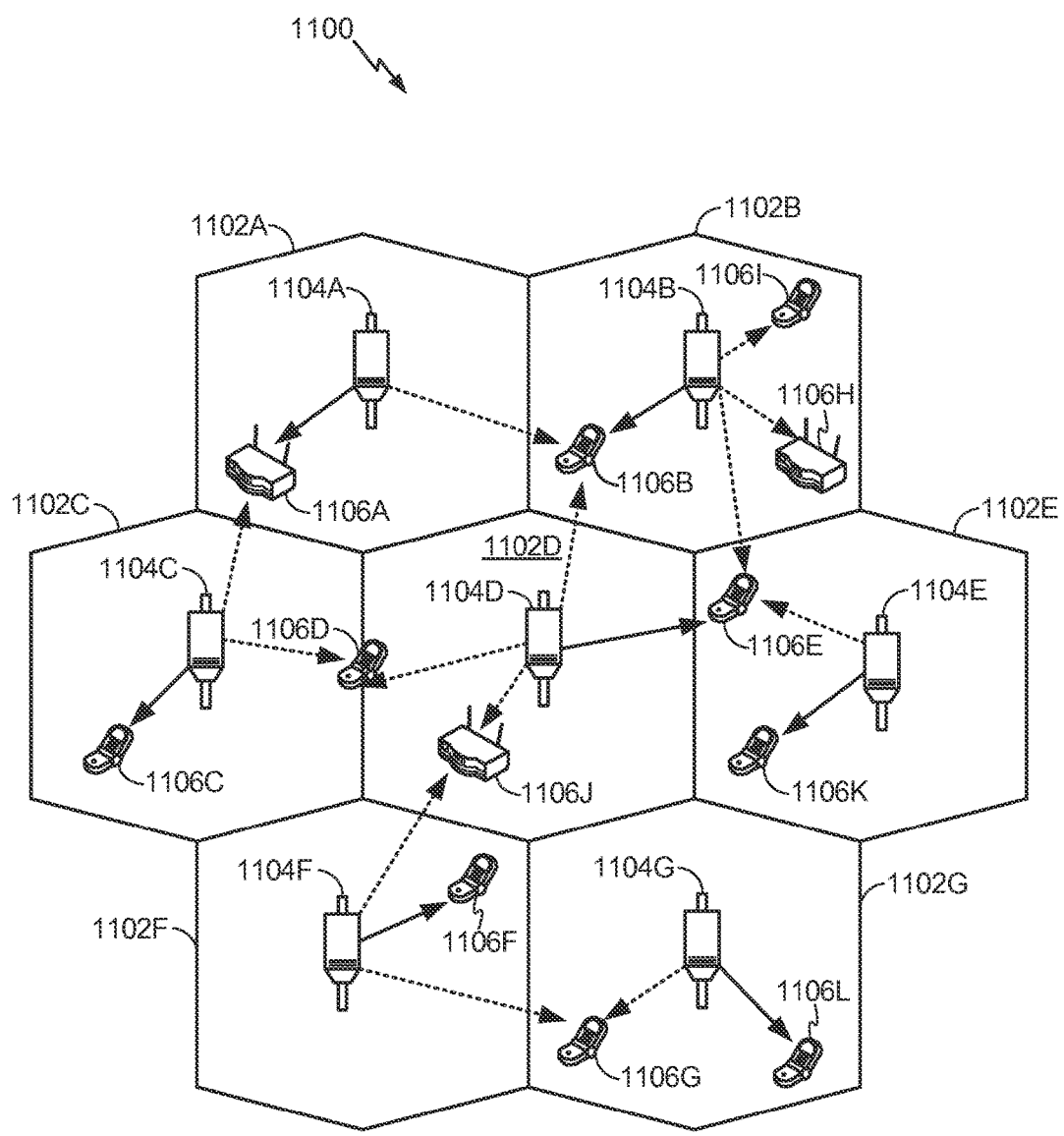
FIG. 11 is a simplified diagram of a wireless communication system.

FIG. 11 illustrates a wireless communication system 1100, configured to support a number of users, in which the teachings herein may be implemented. The system 1100 provides communication for multiple cells 1102, such as, for example, macro cells 1102A-11202G, with each cell being serviced by a corresponding access point 1104 (e.g., access points 1104A-1104G). As shown in FIG. 11, access terminals 1106 (e.g., access terminals 1106A-1106L) may be dispersed at various locations throughout the system over time. Each access terminal 1106 may communicate with one or more access points 1104 on a forward link (FL) and/or a reverse link (RL) at a given moment, depending upon whether the access terminal 1106 is active and whether it is in soft handoff, for example. The wireless communication system 1100 may provide service over a large geographic region. For example, macro cells 1102A-1102G may cover a few blocks in a neighborhood or several miles in a rural environment.

Figure 12:
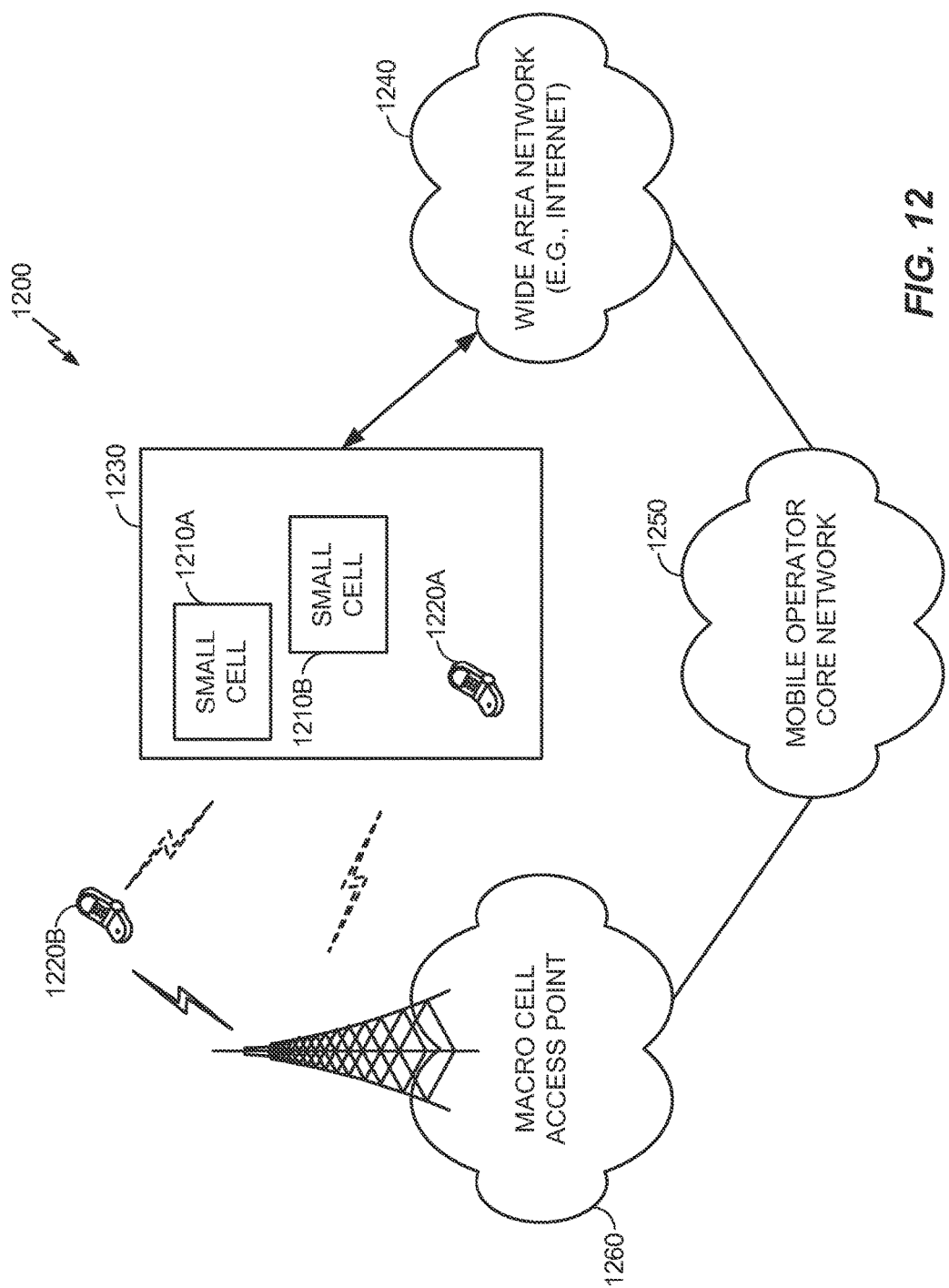
FIG. 12 is a simplified diagram of a wireless communication system including small cells.

FIG. 12 illustrates an example of a communication system 1200 where one or more small cells are deployed within a network environment. Specifically, the system 1200 includes multiple small cells 1210 (e.g., small cells 1210A and 1210B) installed in a relatively small scale network environment (e.g., in one or more user residences 1230). Each small cell 1210 may be coupled to a wide area network 1240 (e.g., the Internet) and a mobile operator core network 1250 via a DSL router, a cable modem, a wireless link, or other connectivity means (not illustrated). As is discussed below, each small cell 1210 may be configured to serve associated access terminals 1220 (e.g., access terminal 1220A) and, optionally, other (e.g., hybrid or alien) access terminals 1220 (e.g., access terminal 1220B). In other words, access to small cells 1210 may be restricted whereby a given access terminal 1220 may be served by a set of designated (e.g., home) small cell(s) 1210 but may not be served by any non-designated small cells 1210 (e.g., a neighbor's small cell 1210).

Figure 13:
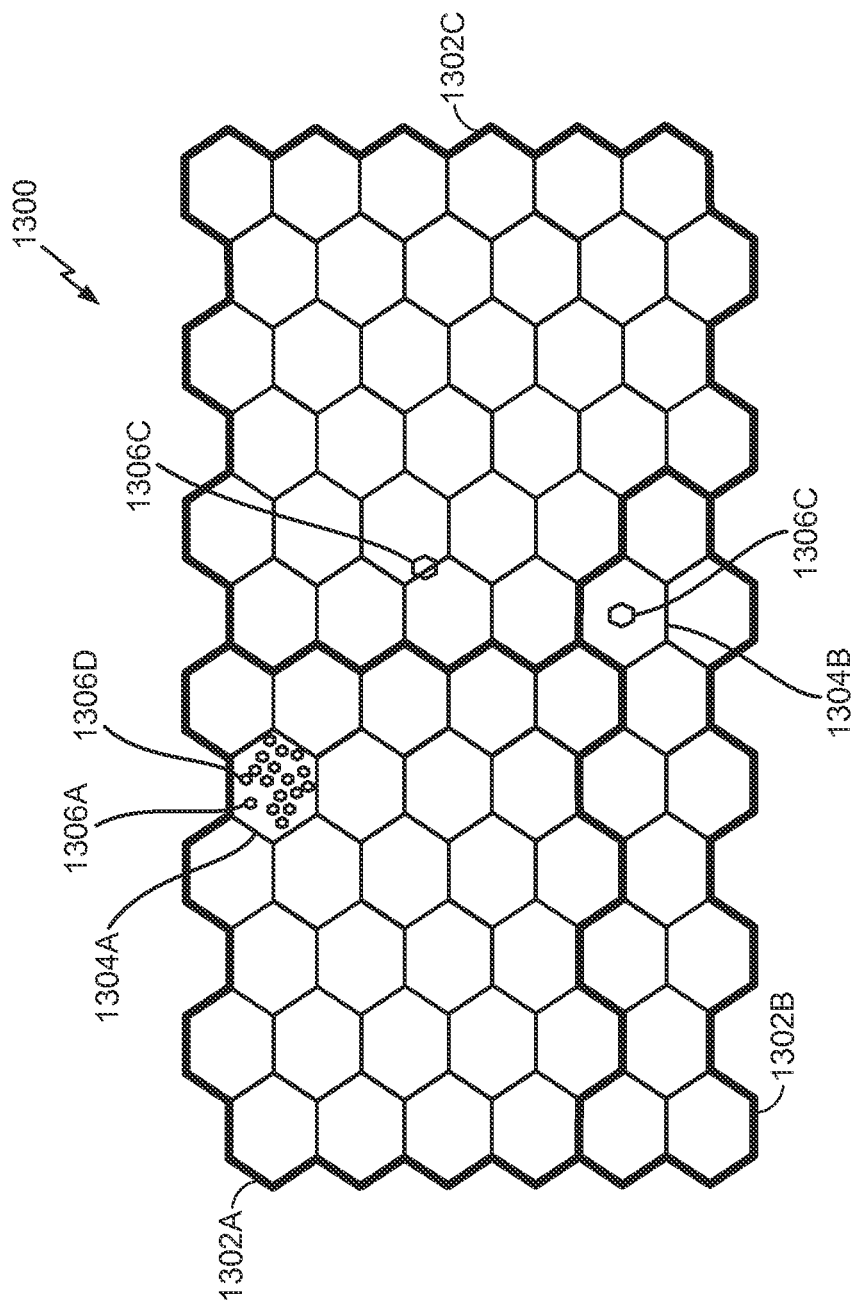
FIG. 13 is a simplified diagram illustrating coverage areas for wireless communication.

FIG. 13 illustrates an example of a coverage map 1300 where several tracking areas 1302 (or routing areas or location areas) are defined, each of which includes several macro coverage areas 1304. Here, areas of coverage associated with tracking areas 1302A, 1302B, and 1302C are delineated by the wide lines and the macro coverage areas 1304 are represented by the larger hexagons. The tracking areas 1302 also include small cell coverage areas 1306. In this example, each of the small cell coverage areas 1306 (e.g., small cell coverage areas 1306B and 1306C) is depicted within one or more macro coverage areas 1304 (e.g., macro coverage areas 1304A and 1304B). It can be appreciated, however, that some or all of a small cell coverage area 1306 might not lie within a macro coverage area 1304. In practice, a large number of small cell coverage areas 1306 (e.g., small cell coverage areas 1306A and 1306D) may be defined within a given tracking area 1302 or macro coverage area 1304.

Referring again to FIG. 12, the owner of a small cell 1210 may subscribe to mobile service, such as, for example, 3G or 4G mobile service, offered through the mobile operator core network 1250. In addition, an access terminal 1220 may be configured to operate both in macro environments and in smaller scale (e.g., residential) network environments. In other words, depending on the current location of the access terminal 1220, the access terminal 1220 may be served by a macro cell access point 1260 associated with the mobile operator core network 1250 or by any one of a set of small cells 1210 (e.g., the small cells 1210A and 1210B that reside within a corresponding user residence 1230). For example, when a subscriber is outside his home, he is served by a standard macro access point (e.g., access point 1260) and when the subscriber is at home, he is served by a small cell (e.g., small cell 1210A). Here, a small cell 1210 may be backward compatible with legacy access terminals 1220.

A small cell 1210 may be deployed on a single frequency or, in the alternative, on multiple frequencies. Depending on the particular configuration, the single frequency or one or more of the multiple frequencies may overlap with one or more frequencies used by a macro access point (e.g., access point 1260).

In some aspects, an access terminal 1220 may be configured to connect to a preferred small cell (e.g., the home small cell of the access terminal 1220) whenever such connectivity is possible. For example, whenever the access terminal 1120A is within the user's residence 1230, it may be desired that the access terminal 1220A communicate only with the home small cell 1210A or 1210B.

In some aspects, if the access terminal 1220 operates within the macro cellular network 1250 but is not residing on its most preferred network (e.g., as defined in a preferred roaming list), the access terminal 1220 may continue to search for the most preferred network (e.g., the preferred small cell 1310) using a better system reselection (BSR) procedure, which may involve a periodic scanning of available systems to determine whether better systems are currently available and subsequently acquire such preferred systems. The access terminal 1220 may limit the search for a specific band and channel. For example, one or more small cell channels may be defined whereby all small cells (or all restricted small cells) in a region operate on the small cell channel(s). The search for the most preferred system may be repeated periodically. Upon discovery of a preferred small cell 1210, the access terminal 1220 selects the small cell 1210 and registers on it for use when within its coverage area.

Access to a small cell may be restricted in some aspects. For example, a given small cell may only provide certain services to certain access terminals. In deployments with so-called restricted (or closed) access, a given access terminal may only be served by the macro cell mobile network and a defined set of small cells (e.g., the small cells 1210 that reside within the corresponding user residence 1230). In some implementations, an access point may be restricted to not provide, for at least one node (e.g., access terminal), at least one of: signaling, data access, registration, paging, or service.

In some aspects, a restricted small cell (which may also be referred to as a Closed Subscriber Group Home NodeB) is one that provides service to a restricted provisioned set of access terminals. This set may be temporarily or permanently extended as necessary. In some aspects, a Closed Subscriber Group (CSG) may be defined as the set of access points (e.g., small cells) that share a common access control list of access terminals.

Various relationships may thus exist between a given small cell and a given access terminal. For example, from the perspective of an access terminal, an open small cell may refer to a small cell with unrestricted access (e.g., the small cell allows access to any access terminal). A restricted small cell may refer to a small cell that is restricted in some manner (e.g., restricted for access and/or registration). A home small cell may refer to a small cell on which the access terminal is authorized to access and operate on (e.g., permanent access is provided for a defined set of one or more access terminals). A hybrid (or guest) small cell may refer to a small cell on which different access terminals are provided different levels of service (e.g., some access terminals may be allowed partial and/or temporary access while other access terminals may be allowed full access). An alien small cell may refer to a small cell on which the access terminal is not authorized to access or operate on, except for perhaps emergency situations (e.g., 911 calls).

From a restricted small cell perspective, a home access terminal may refer to an access terminal that is authorized to access the restricted small cell installed in the residence of that access terminal's owner (usually the home access terminal has permanent access to that small cell). A guest access terminal may refer to an access terminal with temporary access to the restricted small cell (e.g., limited based on deadline, time of use, bytes, connection count, or some other criterion or criteria). An alien access terminal may refer to an access terminal that does not have permission to access the restricted small cell, except for perhaps emergency situations, for example, such as 911 calls (e.g., an access terminal that does not have the credentials or permission to register with the restricted small cell).

The teachings herein may be employed in a wireless multiple-access communication system that simultaneously supports communication for multiple wireless access terminals. Here, each terminal may communicate with one or more access points via transmissions on the forward and reverse links. The forward link (or downlink) refers to the communication link from the access points to the terminals, and the reverse link (or uplink) refers to the communication link from the terminals to the access points. This communication link may be established via a single-in-single-out system, a multiple-in-multiple-out (MIMO) system, or some other type of system.

A MIMO system employs multiple (NT) transmit antennas and multiple (NR) receive antennas for data transmission. A MIMO channel formed by the NT transmit and NR receive antennas may be decomposed into NS independent channels, which are also referred to as spatial channels, where $NS \leq \min\{NT, NR\}$. Each of the NS independent channels corresponds to a dimension. The MIMO system may provide improved performance (e.g., higher throughput and/or greater reliability) if the additional dimensionalities created by the multiple transmit and receive antennas are utilized.

A MIMO system may support time division duplexing (TDD) and frequency division duplexing (FDD). In a TDD system, the forward and reverse link transmissions are on the same frequency region so that the reciprocity principle allows the estimation of the forward link channel from the reverse link channel. This enables the access point to extract transmit beam-forming gain on the forward link when multiple antennas are available at the access point.

Figure 14:
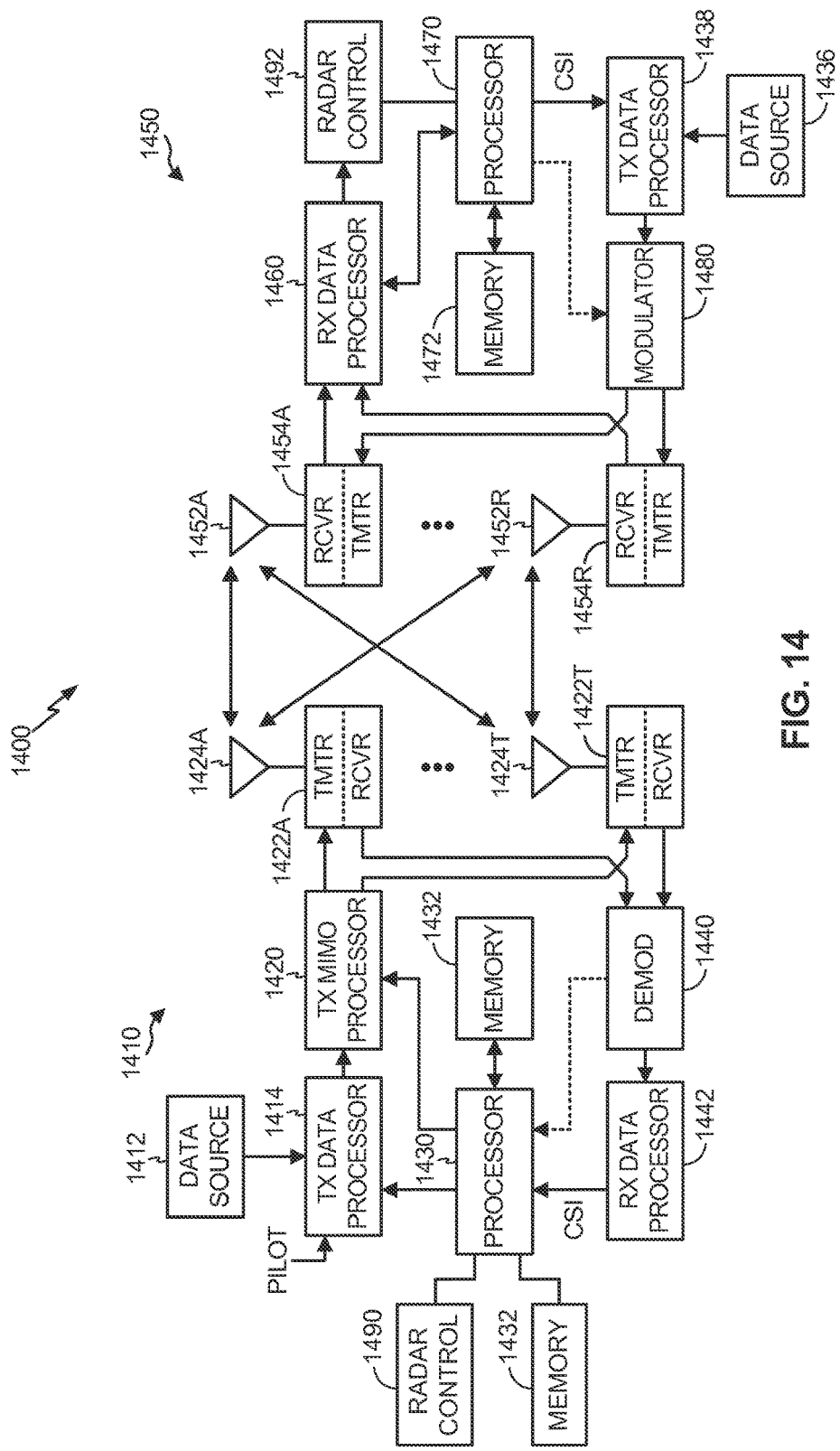
FIG. 14 is a simplified block diagram of several sample aspects of communication components.

FIG. 14 illustrates a wireless device 1410 (e.g., an access point) and a wireless device 1450 (e.g., an access terminal) of a sample MIMO system 1400. At the device 1410, traffic data for a number of data streams is provided from a data source 1412 to a transmit (TX) data processor 1414. Each data stream may then be transmitted over a respective transmit antenna.

The TX data processor 1414 formats, codes, and interleaves the traffic data for each data stream based on a particular coding scheme selected for that data stream to provide coded data. The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 1430. A data memory 1432 may store program code, data, and other information used by the processor 1430 or other components of the device 1410.

The modulation symbols for all data streams are then provided to a TX MIMO processor 1420, which may further process the modulation symbols (e.g., for OFDM). The TX MIMO processor 1420 then provides NT modulation symbol streams to NT transceivers (XCVR) 1422A through 1422T. In some aspects, the TX MIMO processor 1420 applies beam-forming weights to the symbols of the data streams and to the antenna from which the symbol is being transmitted.

Each transceiver 1422 receives and processes a respective symbol stream to provide one or more analog signals, and further conditions (e.g., amplifies, filters, and upconverts) the analog signals to provide a modulated signal suitable for transmission over the MIMO channel. NT modulated signals from transceivers 1422A through 1422T are then transmitted from NT antennas 1424A through 1424T, respectively.

At the device 1450, the transmitted modulated signals are received by NR antennas 1452A through 1452R and the received signal from each antenna 1452 is provided to a respective transceiver (XCVR) 1454A through 1454R. Each transceiver 1454 conditions (e.g., filters, amplifies, and downconverts) a respective received signal, digitizes the conditioned signal to provide samples, and further processes the samples to provide a corresponding "received" symbol stream.

A receive (RX) data processor 1460 then receives and processes the NR received symbol streams from NR transceivers 1454 based on a particular receiver processing technique to provide NT "detected" symbol streams. The RX data processor 1460 then demodulates, deinterleaves, and decodes each detected symbol stream to recover the traffic data for the data stream. The processing by the RX data processor 1460 is complementary to that performed by the TX MIMO processor 1420 and the TX data processor 1414 at the device 1410.

A processor 1470 periodically determines which pre-coding matrix to use (discussed below). The processor 1470 formulates a reverse link message comprising a matrix index portion and a rank value portion. A data memory 1472 may store program code, data, and other information used by the processor 1470 or other components of the device 1450.

The reverse link message may comprise various types of information regarding the communication link and/or the received data stream. The reverse link message is then processed by a TX data processor 1438, which also receives traffic data for a number of data streams from a data source 1436, modulated by a modulator 1480, conditioned by the transceivers 1454A through 1454R, and transmitted back to the device 1410.

At the device 1410, the modulated signals from the device 1450 are received by the antennas 1424, conditioned by the transceivers 1422, demodulated by a demodulator (DEMOD) 1440, and processed by a RX data processor 1442 to extract the reverse link message transmitted by the device 1450. The processor 1430 then determines which pre-coding matrix to use for determining the beam-forming weights then processes the extracted message.

FIG. 14 also illustrates that the communication components may include one or more components that perform radar detection operations as taught herein. For example, a radar control component 1490 may cooperate with the processor 1430 and/or other components of the device 1410 to detect radar as taught herein. Similarly, a radar control component 1492 may cooperate with the processor 1470 and/or other components of the device 1450 to detect radar as taught herein. It can be appreciated that for each device 1410 and 1450 the functionality of two or more of the described components may be provided by a single component. For example, a single processing component may provide the functionality of the radar control component 1490 and the processor 1430 and a single processing component may provide the functionality of the radar control component 1492 and the processor 1470.

The teachings herein may be incorporated into various types of communication systems and/or system components. In some aspects, the teachings herein may be employed in a multiple-access system capable of supporting communication with multiple users by sharing the available system resources (e.g., by specifying one or more of bandwidth, transmit power, coding, interleaving, and so on). For example, the teachings herein may be applied to any one or combinations of the following technologies: Code Division Multiple Access (CDMA) systems, Multiple-Carrier CDMA (MCCDMA), Wideband CDMA (W-CDMA), High-Speed Packet Access (HSPA, HSPA+) systems, Time Division Multiple Access (TDMA) systems, Frequency Division Multiple Access (FDMA) systems, Single-Carrier FDMA (SC-FDMA) systems, Orthogonal Frequency Division Multiple Access (OFDMA) systems, or other multiple access techniques. A wireless communication system employing the teachings herein may be designed to implement one or more standards, such as IS-95, cdma2000, IS-856, W-CDMA, TDSCDMA, and other standards. A CDMA network may implement a radio technology such as Universal Terrestrial Radio Access (UTRA), cdma2000, or some other technology. UTRA includes W-CDMA and Low Chip Rate (LCR). The cdma2000 technology covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). The teachings herein may be implemented in a 3GPP Long Term Evolution (LTE) system, an Ultra-Mobile Broadband (UMB) system, and other types of systems. LTE is a release of UMTS that uses E-UTRA. UTRA, E-UTRA, GSM, UMTS and LTE are described in documents from an organization named "3rd Generation Partnership Project" (3GPP), while cdma2000 is described in documents from an organization named "3rd Generation Partnership Project 2" (3GPP2). Although certain aspects of the disclosure may be described using 3GPP terminology, it is to be understood that the teachings herein may be applied to 3GPP (e.g., Rel99, Rel5, Rel6, Rel7) technology, as well as 3GPP2 (e.g., 1×RTT, 1×EV-DO Rel0, RevA, RevB) technology and other technologies.

The teachings herein may be incorporated into (e.g., implemented within or performed by) a variety of apparatuses (e.g., nodes). In some aspects, a node (e.g., a wireless node) implemented in accordance with the teachings herein may comprise an access point or an access terminal.

For example, an access terminal may comprise, be implemented as, or known as user equipment, a subscriber station, a subscriber unit, a mobile station, a mobile, a mobile node, a remote station, a remote terminal, a user terminal, a user agent, a user device, or some other terminology. In some implementations, an access terminal may comprise a cellular telephone, a cordless telephone, a session initiation protocol (SIP) phone, a wireless local loop (WLL) station, a personal digital assistant (PDA), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a tablet, a portable communication device, a portable computing device (e.g., a personal data assistant), an entertainment device (e.g., a music device, a video device, or a satellite radio), a global positioning system device, or any other suitable device that is configured to communicate via a wireless medium.

An access point may comprise, be implemented as, or known as a NodeB, an eNodeB, a radio network controller (RNC), a base station (BS), a radio base station (RBS), a base station controller (BSC), a base transceiver station (BTS), a transceiver function (TF), a radio transceiver, a radio router, a basic service set (BSS), an extended service set (ESS), a macro cell, a macro node, a Home eNB (HeNB), a femto cell, a femto node, a pico node, or some other similar terminology.

In some aspects, a node (e.g., an access point) may comprise an access node for a communication system. Such an access node may provide, for example, connectivity for or to a network (e.g., a wide area network such as the Internet or a cellular network) via a wired or wireless communication link to the network. Accordingly, an access node may enable another node (e.g., an access terminal) to access a network or some other functionality. In addition, it can be appreciated that one or both of the nodes may be portable or, in some cases, relatively non-portable.

Also, it can be appreciated that a wireless node may be capable of transmitting and/or receiving information in a non-wireless manner (e.g., via a wired connection). Thus, a receiver and a transmitter as discussed herein may include appropriate communication interface components (e.g., electrical or optical interface components) to communicate via a non-wireless medium.

A wireless node may communicate via one or more wireless communication links that are based on or otherwise support any suitable wireless communication technology. For example, in some aspects a wireless node may associate with a network. In some aspects, the network may comprise a local area network or a wide area network. A wireless device may support or otherwise use one or more of a variety of wireless communication technologies, protocols, or standards such as those discussed herein (e.g., CDMA, TDMA, OFDM, OFDMA, WiMAX, Wi-Fi, and so on). Similarly, a wireless node may support or otherwise use one or more of a variety of corresponding modulation or multiplexing schemes. A wireless node may thus include appropriate components (e.g., air interfaces) to establish and communicate via one or more wireless communication links using the above or other wireless communication technologies. For example, a wireless node may comprise a wireless transceiver with associated transmitter and receiver components that may include various components (e.g., signal generators and signal processors) that facilitate communication over a wireless medium.

The functionality described herein (e.g., with regard to one or more of the accompanying figures) may correspond in some aspects to similarly designated "means for" functionality in the appended claims.

Figure 15A:
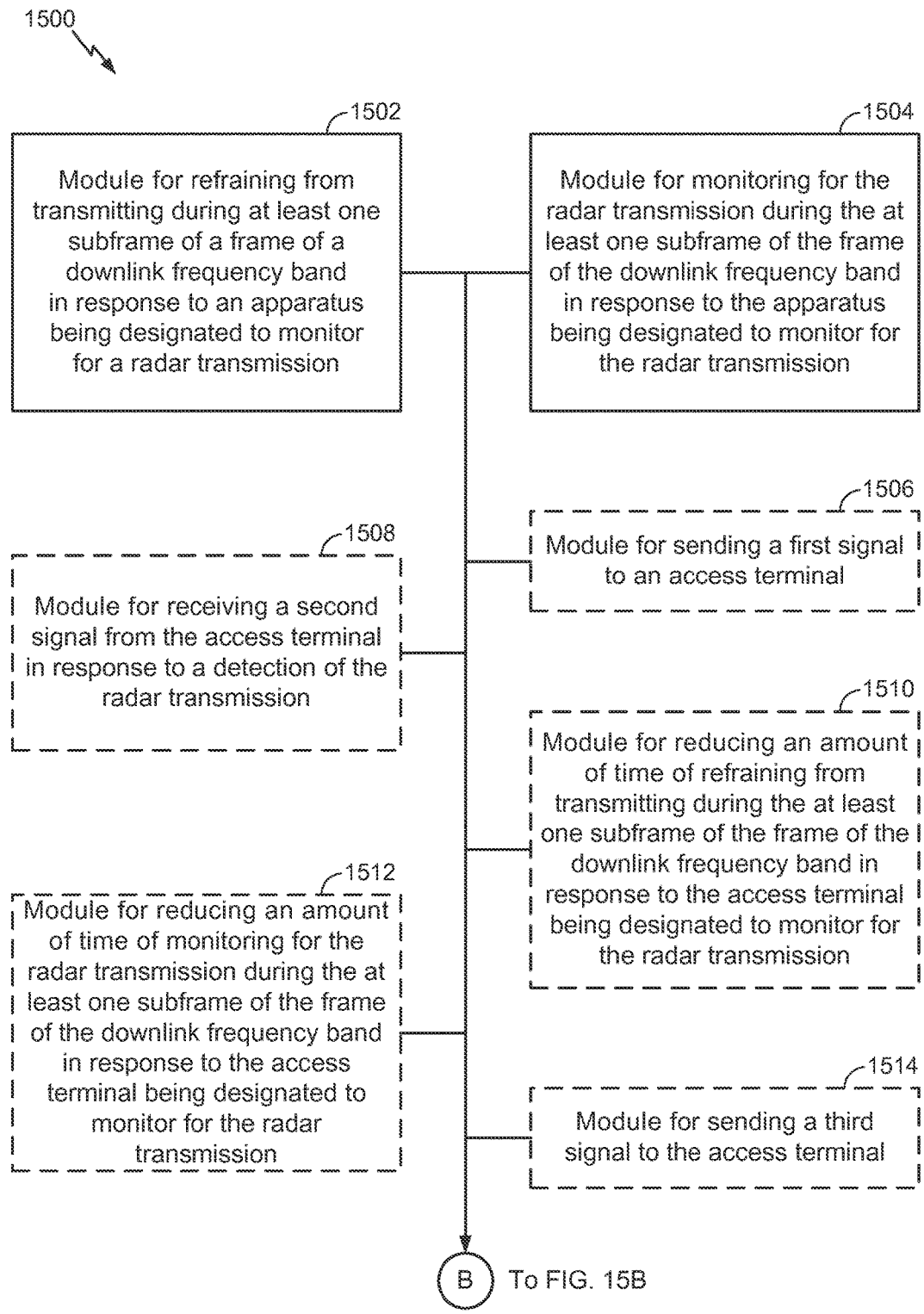
FIGS. 15A and 15B are a simplified block diagram of several sample aspects of an apparatus configured to support radar detection as taught herein.
Figure 15B:
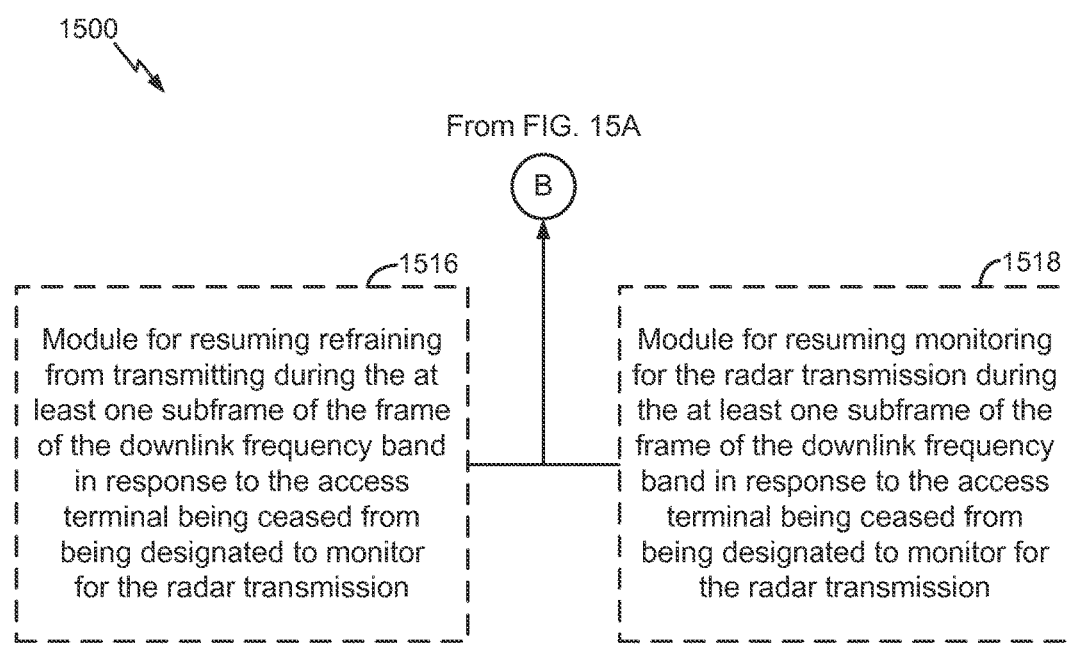

Referring to FIGS. 15A and 15B, an apparatus 1500 is represented as a series of interrelated functional modules. A module 1502 for causing an apparatus, configured to communicate with an access terminal in a wireless network and operating in a frequency-division duplexing mode, to refrain from transmitting during at least one subframe of a frame of a downlink frequency band in response to the apparatus being designated to monitor for the radar transmission may correspond at least in some aspects to, for example, a switch as discussed herein. A module 1504 for causing the apparatus to monitor for the radar transmission during the at least one subframe of the frame of the downlink frequency band in response to the apparatus being designated to monitor for the radar transmission may correspond at least in some aspects to, for example, a circuit (e.g., an electronic processor) as discussed herein. A module 1506 for causing the apparatus to send a first signal to the access terminal may correspond at least in some aspects to, for example, a circuit as discussed herein. A module 1508 for causing the apparatus to receive a second signal from the access terminal in response to a detection of the radar transmission may correspond at least in some aspects to, for example, a circuit as discussed herein. A module 1510 for causing the apparatus to reduce an amount of time of refraining from transmitting during the at least one subframe of the frame of the downlink frequency band in response to the access terminal being designated to monitor for the radar transmission may correspond at least in some aspects to, for example, a circuit discussed herein. A module 1512 for causing the apparatus to reduce an amount of time of monitoring for the radar transmission during the at least one subframe of the frame of the downlink frequency band in response to the access terminal being designated to monitor for the radar transmission may correspond at least in some aspects to, for example, a circuit discussed herein. A module 1514 for causing the apparatus to send a third signal to the access terminal may correspond at least in some aspects to, for example, a circuit discussed herein. A module 1516 for causing the apparatus to resume refraining from transmitting during the at least one subframe of the frame of the downlink frequency band in response to the access terminal being ceased from being designated to monitor for the radar transmission may correspond at least in some aspects to, for example, a circuit discussed herein. A module 1518 for causing the apparatus to resume monitoring for the radar transmission during the at least one subframe of the frame of the downlink frequency band in response to the access terminal being ceased from being designated to monitor for the radar transmission may correspond at least in some aspects to, for example, a circuit discussed herein.

The functionality of the modules of FIGS. 15A and 15B may be implemented in various ways consistent with the teachings herein. In some aspects, the functionality of these modules may be implemented as one or more electrical components. In some aspects, the functionality of these blocks may be implemented as a processing system including one or more processor components. In some aspects, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it is appreciated by those skilled in the art that a given subset (e.g., of an integrated circuit and/or of a set of software modules) may provide at least a portion of the functionality for more than one module. As one specific example, the apparatus 1500 may comprise a single device (e.g., components 1502 through 1518 comprising different sections of an ASIC). As another specific example, the apparatus 1500 may comprise several devices (e.g., the component 1502 comprising one ASIC and the components 1504 through 1518 comprising another ASIC). The functionality of these modules also may be implemented in some other manner as taught herein. In some aspects one or more of any dashed blocks in FIGS. 15A and 15B are optional.

In addition, the components and functions represented by FIGS. 15A and 15B as well as other components and functions described herein, may be implemented using any suitable means. Such means also may be implemented, at least in part, using corresponding structure as taught herein. For example, the components described above in conjunction with the "module for" components of FIGS. 15A and 15B also may correspond to similarly designated "means for" functionality. Thus, in some aspects one or more of such means may be implemented using one or more of processor components, integrated circuits, or other suitable structure as taught herein.

In some aspects, an apparatus or any component of an apparatus may be configured to (or operable to or adapted to) provide functionality as taught herein. This may be achieved, for example: by manufacturing (e.g., fabricating) the apparatus or component so that it can provide the functionality; by programming the apparatus or component so that it can provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

Those of skill appreciate that any of the various illustrative logical blocks, modules, processors, means, circuits, and algorithm operations described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions are not to be interpreted as causing a departure from the scope of the present disclosure.

The various illustrative logical blocks, modules, and circuits described in connection with the aspects disclosed herein may be implemented within or performed by a processing system, an integrated circuit ("IC"), an access terminal, or an access point. A processing system may be implemented using one or more ICs or may be implemented within an IC (e.g., as part of a system on a chip). An IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of operations in any disclosed process is an example of a sample approach. Based upon design preferences, it is understood that the specific order or hierarchy of operations in the processes may be rearranged while remaining within the scope of the present disclosure. The accompanying method claims present elements of the various operations in a sample order, and are not meant to be limited to the specific order or hierarchy presented.

The operations of a method or algorithm described in connection with the aspects disclosed herein may be embodied directly in hardware, in a software module executed by a processor, or in a combination of the two. A software module (e.g., including executable instructions and related data) and other data may reside in a memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising code(s) executable (e.g., executable by at least one computer) to provide functionality relating to one or more of the aspects of the disclosure. In some aspects, a computer program product may comprise packaging materials.

In one or more implementations, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A computer-readable media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer-readable medium (e.g., tangible media, computer-readable storage medium, computer-readable storage device, etc.). Such a non-transitory computer-readable medium (e.g., computer-readable storage device) may comprise any of the tangible forms of media described herein or otherwise known (e.g., a memory device, a media disk, etc.). In addition, in some aspects computer-readable medium may comprise transitory computer readable medium (e.g., comprising a signal). Combinations of the above can also be included within the scope of computer-readable media. It can be appreciated that a computer-readable medium may be implemented in any suitable computer-program product.

Moreover, the methods, sequences, and/or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor (e.g., cache memory).

While the foregoing disclosure describes various illustrative aspects, it is noted that various changes and modifications may be made to the illustrated examples without departing from the scope defined by the appended claims. The present disclosure is not intended to be limited to the specifically illustrated examples alone. For example, unless otherwise noted, the functions, operations, and/or actions of the method claims in accordance with the aspects of the disclosure described herein need not be performed in any particular order. Furthermore, although certain aspects may be described or claimed in the singular, the plural is contemplated unless limitation to the singular is explicitly stated.

What is claimed is:

1. A method for detecting, in a wireless network, a radar transmission from a radar source, comprising:
    designating an apparatus, configured to communicate with an access terminal in the wireless network on a channel operating in a frequency-division duplexing mode, to monitor the channel for the radar transmission from the radar source while operating on the channel;
    causing the apparatus to refrain from transmitting on the channel during at least one subframe of a frame of a downlink frequency band associated with the channel;
    causing the apparatus to monitor the channel for the radar transmission from the radar source while operating on the channel and to detect the radar transmission from the radar source on the channel during the at least one subframe of the frame of the downlink frequency band in which the apparatus is caused to refrain from transmitting on the channel; and
    based on a power level of the radar transmission from the radar source being greater than a threshold value during the at least one subframe of the frame of the downlink frequency band in which the apparatus is caused to monitor the channel for the radar transmission from the radar source, causing the apparatus to switch to a different channel to communicate with the access terminal.

2. The method of claim 1, wherein the apparatus is configured to perform a function of at least one of an Access Point, a Node B, an Evolved Node B, a radio network controller, a base station, a radio base station, a base station controller, a base transceiver station, a transceiver function, a radio transceiver, a radio router, a basic service set, an extended service set, a macro cell, a macro node, a Home eNB, a femto cell, a femto node, a pico node, a relay node, or a combination thereof.

3. The method of claim 1, wherein a placement of the at least one subframe within the frame of the downlink frequency band corresponds to a placement of at least one subframe that is designated for an uplink communication within a frame of a wireless network that uses time-division duplexing.

4. The method of claim 3, wherein the placement of the at least one subframe that is designated for the uplink communication within the frame of the wireless network that uses time-division duplexing is in accordance with a predetermined configuration of the frame of the wireless network that uses time-division duplexing.

5. The method of claim 4, wherein the predetermined configuration is in accordance with the Long-Term Evolution Time-Division Duplex standard.

6. The method of claim 1, wherein a placement of the at least one subframe within the frame of the downlink frequency band corresponds to a placement of at least one subframe that is designated for a transmission in accordance with the Multimedia Broadcast Multicast Service specification.

7. The method of claim 1, further comprising causing the apparatus to send a first signal to the access terminal, the first signal configured to cause the access terminal to be designated to monitor the channel for the radar transmission.

8. The method of claim 7, further comprising causing the apparatus to receive a second signal from the access terminal in response to a detection of the radar transmission.

9. The method of claim 7, further comprising:
causing the apparatus to reduce an amount of time of refraining from transmitting during the at least one subframe of the frame of the downlink frequency band in response to the access terminal being designated to monitor the channel for the radar transmission; and
causing the apparatus to reduce an amount of time of monitoring the channel for the radar transmission during the at least one subframe of the frame of the downlink frequency band in response to the access terminal being designated to monitor the channel for the radar transmission.

10. The method of claim 9, further comprising:
causing the apparatus to send a second signal to the access terminal, the second signal configured to cause the access terminal to cease from being designated to monitor the channel for the radar transmission.

11. The method of claim 10, further comprising:
causing the apparatus to resume refraining from transmitting during the at least one subframe of the frame of the downlink frequency band in response to the access terminal being ceased from being designated to monitor the channel for the radar transmission; and
causing the apparatus to resume monitoring the channel for the radar transmission during the at least one subframe of the frame of the downlink frequency band in response to the access terminal being ceased from being designated to monitor the channel for the radar transmission.

12. The method of claim 1, further comprising:
causing the apparatus to switch to a different channel to communicate with the access terminal based on a power level of the detected radar transmission from the radar source being greater than a threshold.

13. The method of claim 1, wherein the channel is designated for both radar transmissions and cellular communications, and wherein the apparatus is designated to monitor the channel for the radar transmission from the radar source while operating on the channel based on the channel being designated for both radar transmissions and cellular communications.

14. An apparatus for detecting, in a wireless network, a radar transmission from a radar source, comprising:
a transmitter configured to operate on a channel in a frequency-division duplexing mode and to refrain from transmitting on the channel during at least one subframe of a frame of a downlink frequency band associated with the channel in response to the apparatus being designated to monitor the channel for the radar transmission from the radar source while the transmitter is configured to operate on the channel, the apparatus configured to communicate with an access terminal in the wireless network on the channel; and
a circuit configured to designate the apparatus to monitor the channel for the radar transmission from the radar source while the transmitter is configured to operate on the channel and to detect the radar transmission from the radar source on the channel during the at least one subframe of the frame of the downlink frequency band in which the transmitter is configured to refrain from transmitting on the channel,
wherein the circuit is further configured to cause the apparatus to switch to a different channel to communicate with the access terminal based on a power level of the radar transmission from the radar source being greater than a threshold value during the at least one subframe of the frame of the downlink frequency band in which the apparatus is caused to monitor the channel for the radar transmission from the radar source.

15. The apparatus of claim 14, further comprising a switch configured to cause the transmitter to refrain from transmitting during the at least one subframe of the frame of the downlink frequency band, wherein the switch comprises at least one of a relay, a semiconductor device, or a microelectromechanical switch.

16. The apparatus of claim 14, wherein the circuit comprises:
a first antenna configured to receive a first electromagnetic radiation; and
an electronic processor coupled to the first antenna and configured to determine if the first electromagnetic radiation is the radar transmission.

17. The apparatus of claim 16, further comprising a second antenna coupled to the transmitter and configured to transmit a second electromagnetic radiation, wherein the transmitter is configured to produce the second electromagnetic radiation.

18. The apparatus of claim 17, wherein the first antenna is the second antenna, and wherein a switch configured to cause the transmitter to refrain from transmitting during the at least one subframe of the downlink frequency band is selectively coupled to the electronic processor or the transmitter.

19. The apparatus of claim 14, wherein the circuit is further configured to send a first signal to the access terminal, the first signal configured to cause the access terminal to be designated to monitor the channel for the radar transmission.

20. The apparatus of claim 19, wherein the circuit is further configured to receive a second signal from the access terminal in response to a detection of the radar transmission.

21. The apparatus of claim 19, wherein the circuit is further configured to cause the apparatus to reduce an amount of time of refraining from transmitting during the at least one subframe of the frame of the downlink frequency band in response to the access terminal being designated to monitor the channel for the radar transmission, and to cause the apparatus to reduce an amount of time of monitoring the channel for the radar transmission during the at least one subframe of the frame of the downlink frequency band in response to the access terminal being designated to monitor the channel for the radar transmission.

22. The apparatus of claim 21, wherein the circuit is further configured to cause the apparatus to send a second signal to the access terminal, the second signal configured to cause the access terminal to cease from being designated to monitor the channel for the radar transmission.

23. The apparatus of claim 22, wherein the circuit is further configured to cause the apparatus to resume refraining from transmitting during the at least one subframe of the frame of the downlink frequency band in response to the access terminal being ceased from being designated to monitor the channel for the radar transmission, and to cause the apparatus to resume monitoring the channel for the radar transmission during the at least one subframe of the frame of the downlink frequency band in response to the access terminal being ceased from being designated to monitor the channel for the radar transmission.

24. An apparatus for detecting, in a wireless network, a radar transmission from a radar source, comprising:
   means for designating the apparatus, configured to communicate with an access terminal in the wireless network on a channel operating in a frequency-division duplexing mode, to monitor the channel for the radar transmission from the radar source while operating on the channel;
   means for causing the apparatus to refrain from transmitting on the channel during at least one subframe of a frame of a downlink frequency band associated with the channel;
   means for causing the apparatus to monitor the channel for the radar transmission from the radar source while operating on the channel and to detect the radar transmission from the radar source on the channel during the at least one subframe of the frame of the downlink frequency band in which the apparatus is caused to refrain from transmitting on the channel;
   means for causing, based on a power level of the radar transmission from the radar source being greater than a threshold value during the at least one subframe of the frame of the downlink frequency band in which the apparatus is caused to monitor the channel for the radar transmission from the radar source, the apparatus to switch to a different channel to communicate with the access terminal.

25. The apparatus of claim 24, further comprising means for causing the apparatus to send a first signal to the access terminal, the first signal configured to cause the access terminal to be designated to the channel for the radar transmission.

26. The apparatus of claim 25, further comprising means for causing the apparatus to receive a second signal from the access terminal in response to a detection of the radar transmission.

27. The apparatus of claim 25, further comprising means for causing the apparatus to send a second signal to the access terminal, the second signal configured to cause the access terminal to cease from being designated to monitor the channel for the radar transmission.

28. A non-transitory computer-readable recording medium for detecting, in a wireless network, a radar transmission from a radar source, comprising:
   at least one instruction to designate an apparatus, configured to communicate with an access terminal in the wireless network on a channel operating in a frequency-division duplexing mode, to monitor the channel for the radar transmission from the radar source while operating on the channel;
   at least one instruction to cause the apparatus to refrain from transmitting on the channel during at least one subframe of a frame of a downlink frequency band associated with the channel;
   at least one instruction to cause the apparatus to monitor the channel for the radar transmission from the radar source while operating on the channel and to detect the radar transmission from the radar source on the channel during the at least one subframe of the frame of the downlink frequency band in which the apparatus is caused to refrain from transmitting on the channel; and
   at least one instruction to cause the apparatus, based on a power level of the radar transmission from the radar source being greater than a threshold value during the at least one subframe of the frame of the downlink frequency band in which the apparatus is caused to monitor the channel for the radar transmission from the radar source, to switch to a different channel to communicate with the access terminal.

29. The non-transitory computer-readable recording medium of claim 28, further comprising at least one instruction to cause the apparatus to receive a second signal from the access terminal in response to a detection of the radar transmission.

30. The non-transitory computer-readable recording medium of claim 28, further comprising:
   at least one instruction to cause the apparatus to reduce an amount of time of refraining from transmitting during the at least one subframe of the frame of the downlink frequency band in response to the access terminal being designated to monitor the channel for the radar transmission; and
   at least one instruction to cause the apparatus to reduce an amount of time of monitoring the channel for the radar transmission during the at least one subframe of the frame of the downlink frequency band in response to the access terminal being designated to monitor the channel for the radar transmission.

* * * * *